United States Patent
Armbruster, Jr. et al.

(10) Patent No.: US 12,298,255 B2
(45) Date of Patent: May 13, 2025

(54) CONTINUOUS DUST ACCUMULATION MONITORING SYSTEM WITH IMPAIRED OPTICS DETECTION AND CLEANING

(71) Applicant: Industrial Intelligence, Inc., Williamsburg, VA (US)

(72) Inventors: George T. Armbruster, Jr., Williamsburg, VA (US); Shane Diller, Richmond, VA (US); Bruce Seymour Ferris, Richmond, VA (US); Laurence E. Moulis, Charlottesville, VA (US); Viatcheslav Orlov, Richmond, VA (US); Alan Abul-Haj, Sedona, AZ (US); Brent Roeder, Blacksburg, VA (US); Anthony Cosentino, Hilly Springs, NC (US); Samuel DeFilipp, Cary, NC (US)

(73) Assignee: Industrial Intelligence Inc., Williamsburg, VA (US)

( * ) Notice: Subject to any disclaimer, the term of this patent is extended or adjusted under 35 U.S.C. 154(b) by 366 days.

(21) Appl. No.: 17/858,425

(22) Filed: Jul. 6, 2022

(65) Prior Publication Data

US 2023/0011225 A1  Jan. 12, 2023

Related U.S. Application Data

(60) Provisional application No. 63/218,706, filed on Jul. 6, 2021.

(51) Int. Cl.
*G01N 21/94* (2006.01)
*B08B 1/12* (2024.01)
(Continued)

(52) U.S. Cl.
CPC .............. *G01N 21/94* (2013.01); *B08B 1/12* (2024.01); *B08B 1/30* (2024.01); *B08B 13/00* (2013.01);
(Continued)

(58) Field of Classification Search
CPC ..... G01N 2021/155; G01N 2021/9583; G01N 2021/152; G01N 21/15; G01N 21/47;
(Continued)

(56) References Cited

U.S. PATENT DOCUMENTS

| 6,392,738 B1 | 5/2002 | van de Pasch et al. |
| 6,850,328 B1 | 2/2005 | Leirfall |

(Continued)

FOREIGN PATENT DOCUMENTS

| BE | 1025959 A1 | 8/2019 |
| CN | 203311248 U | 11/2013 |

(Continued)

OTHER PUBLICATIONS

International Searching Authority/U.S. Patent and Trademark Office, International Search Report and Written Opinion of International Patent Application No. PCT/US22/36189, Oct. 17, 2022.

*Primary Examiner* — Kathleen V Nguyen
(74) *Attorney, Agent, or Firm* — Williams Mullen; Thomas F Bergert, Esq.

(57) ABSTRACT

A continuous dust accumulation monitoring system, device and method monitors and measures dust accumulation via an enclosure and a machine vision subsystem which can include a digital camera. A dirty optics detection subsystem monitors optical clarity and can invoke a cleaning assembly to help maintain clarity of optics for monitoring and measuring dust accumulation.

21 Claims, 15 Drawing Sheets

(51) Int. Cl.
  *B08B 1/30* (2024.01)
  *B08B 13/00* (2006.01)
  *G01N 21/47* (2006.01)
  *G01N 21/88* (2006.01)
  *G06T 7/00* (2017.01)
  *H04N 23/52* (2023.01)
  *H04N 23/56* (2023.01)

(52) U.S. Cl.
  CPC ......... *G01N 21/47* (2013.01); *G01N 21/8851* (2013.01); *G06T 7/0004* (2013.01); *H04N 23/52* (2023.01); *H04N 23/56* (2023.01)

(58) Field of Classification Search
  CPC .......... G01N 21/59; G01N 21/94; B08B 1/12; B08B 1/30
  See application file for complete search history.

(56) References Cited

U.S. PATENT DOCUMENTS

| | | | |
|---|---|---|---|
| 8,021,469 | B2 | 9/2011 | Niezgoda et al. |
| 10,606,151 | B1* | 3/2020 | Esterholt ................ H04N 23/51 |
| 2016/0243486 | A1 | 8/2016 | Galsim et al. |
| 2017/0284690 | A1 | 10/2017 | Lipanov |
| 2019/0072487 | A1 | 3/2019 | Parsons et al. |
| 2019/0391075 | A1* | 12/2019 | Herrero .................. G01N 21/94 |
| 2020/0030857 | A1* | 1/2020 | Hirayama ................ B08B 5/02 |
| 2021/0164771 | A1 | 6/2021 | Noël |
| 2021/0199554 | A1* | 7/2021 | Armbruster, Jr. .. G01N 15/0227 |

FOREIGN PATENT DOCUMENTS

| | | |
|---|---|---|
| CN | 204177708 U | 2/2015 |
| CN | 204288424 | 4/2015 |
| CN | KOL2015-00655 A | 7/2015 |
| CN | 105278509 A | 1/2016 |
| CN | 205081810 U | 3/2016 |
| CN | 205879740 U | 1/2017 |
| CN | 106740705 A | 5/2017 |
| CN | 206198908 U | 5/2017 |
| CN | 107830611 A | 3/2018 |
| CN | 108106974 A | 6/2018 |
| CN | 108200163 A | 6/2018 |
| CN | 207963055 U | 10/2018 |
| CN | 208282301 | 12/2018 |
| CN | 109140599 A | 1/2019 |
| CN | 109189877 A | 1/2019 |
| CN | 208526168 U | 2/2019 |
| CN | 109709010 A | 5/2019 |
| CN | 109709011 A | 5/2019 |
| CN | 110013718 A | 7/2019 |
| CN | 110017864 A | 7/2019 |
| CN | 110032152 A | 7/2019 |
| CN | 209198271 U | 8/2019 |
| CN | 209326010 U | 8/2019 |
| JP | 2001337029 A | 12/2001 |
| JP | 6204941 B2 | 9/2017 |
| KR | 20100070467 A | 6/2010 |
| KR | 20160150364 A | 12/2016 |
| KR | 101765454 B1 | 8/2017 |
| SE | 1530039 A1 | 10/2016 |
| WO | 9848261 A1 | 10/1998 |
| WO | 2019036920 A1 | 2/2019 |
| WO | 2019173381 | 9/2019 |
| WO | 2020010450 | 1/2020 |

* cited by examiner

CONTINUOUS DUST ACCUMULATION MONITORING SYSTEM WITH IMPAIRED OPTICS DETECTION AND CLEANING

CROSS-REFERENCE TO RELATED APPLICATIONS

The present application claims priority to U.S. Provisional Patent Application No. 63/218,706 filed on Jul. 6, 2021, entitled "Continuous Dust Accumulation Monitoring System with Impaired Optics Detection and Cleaning", the disclosure of which is incorporated by reference herein in its entirety.

TECHNICAL FIELD

The present disclosure relates to dust accumulation monitoring, and more particularly, to a system, device and method for continuous dust accumulation monitoring with impaired optics detection and cleaning.

BACKGROUND

Combustible dust and hazardous dust remain a large concern in industries globally. As defined by the National Electric Code, Class II locations are those that are hazardous because of the presence of combustible dust. Class II locations are further divided into subdivisions, wherein Division 1 locations are defined as an area where the amount of combustible dust is either suspended in the air or accumulated on surfaces in a sufficient concentration to allow for ignition. The types of combustible dust are classified under Groups E, F and G. Group E and F dusts are considered conductive, whereas Group G dusts are not.

Industries with potential dust hazards are required to perform dust hazard analysis at their plants to identify and document potential dust hazards and develop a plan to mitigate fires and hazards. Existing standards such as NFPA 61, Standard for the Prevention of Fires and Dust Explosions in Agricultural and Food Processing Facilities, NFPA 484 Standard for Combustible Metals, NFPA 652, Standard on the Fundamentals of Combustible Dust, NFPA 654, Standard for the Prevention of Fire and Dust Explosions from the Manufacturing, Processing, and Handling of Combustible Particulate Solids, and NFPA 664, Standard for the Prevention of Fires and Explosions in Wood Processing and Woodworking Facilities use a critical thickness of dust accumulation in a facility that handles dust particles. The critical thickness defined as the minimum allowable dust deposition on surfaces in a facility can vary and is generally a function of the size and type of dust handled by the facility. As an example, the 2021 International Fire Code (IFC) cites the critical depth layer in Section 2203.1 as $\frac{1}{8}$ inch for wood flour and $\frac{1}{32}$ inch for all other dusts. Section 2203.01 of the 2021 IFC also states that the critical depth layer is permitted to be adjusted for explosion hazard where further evaluated in accordance with the code.

Historically, measuring dust accumulation has involved visually conducting inspections and checking dust accumulation levels using a gauge measurement tool that is typically the thickness of a U.S. quarter. Personnel must physically measure dust to determine dust accumulation thickness, then assess whether the level of dust over a 1,000 square foot area is averaging over permissible limits of critical thickness as determined for the facility under consideration. Physically monitoring dust accumulation in risk areas of a manufacturing plant using either self-policing plant personnel or regulatory personnel is time-consuming and an unrealistic way to continuously monitor dust accumulation levels on a twenty-four hour per day, seven-day per week basis.

There are currently no continuous dust accumulation monitors that are packaged in a Canadian Standards Association (CSA) or Underwriters Laboratories (UL) certified enclosure rated for use in Class II, Division I Groups E, F & G enclosures for continuous use in combustible dust areas. Nor is there a continuous dust accumulation monitor that is certified to be used in ATEX (a European Union directive for protection against explosive atmospheres) hazardous dust areas. Thus, there remains a need for continuous dust accumulation monitoring systems and devices in a facility that is compliant with both U.S. and European standards and does not require personnel to physically monitor the premises.

SUMMARY

Embodiments of the present disclosure provide a continuous dust accumulation monitoring system, device and method. In various aspects, embodiments of the present disclosure monitor and measure dust accumulation via an enclosure and a machine vision subsystem which can include a digital camera. Multiple continuous dust accumulation monitoring systems may be installed throughout an industrial facility to continuously gather dust accumulation levels and relay this information to system control via a network node using a wired or wireless communication technology such as, but not limited to, Ethernet, optical fiber, Wi-Fi, LoRa, radio frequency (RF) or Bluetooth. Once data points are in the system control, the data can be analyzed using one or more algorithms to determine continuous average dust accumulations in risks areas identified in an industrial plant. Alarms can be triggered once dust accumulations increase to unacceptable levels.

In different embodiments, the enclosure is adapted for use in electrically hazardous locations, and a sample area for collecting ambient dust is provided on or adjacent the enclosure.

A dust accumulation sensor assembly can be installed in the enclosure and configured to generate a signal based on the amount of ambient dust collected on the sample area. A circuit board within the enclosure can be configured to receive the signal from the dust accumulation sensor assembly. A mounting assembly may be included for mounting the enclosure onto a surface. Surfaces may include flat surfaces (e.g., the ground, workspaces, etc.) or curved surfaces (e.g., pipes, rails, I-beams, etc.). In some embodiments, the sample area may be within the enclosure.

Embodiments of the continuous dust accumulation monitoring system may also include one or more communication terminals in connection with the circuit board. For example, the one or more communication terminals may include a wired or wireless communication terminal, an Ethernet communication terminal, a 4-20 mA signal current loop communication terminal, and a RS-485 communication terminal. In some embodiments, the wireless communication terminal uses a communication protocol such as Wi-Fi, LoRa, radio frequency and Bluetooth.

In various embodiments, the continuous dust accumulation monitoring system may include an antenna for transmitting the signal to another device. For example, the antenna may transmit the signal to a network node. The network node may comprise a wireless repeater adapted to relay the signal to another wireless repeater or a wireless router installed on a computer. The signal may be uploaded to a server such as a cloud-based data acquisition system.

The dust accumulation sensor assembly as described herein may include one or more sensors such as an optical sensor, a magnetic sensor, an electrostatic sensor, a radar sensor, a sonar sensor, a photo sensor and a load cell. Examples of suitable optical sensors include laser sensors, infrared sensors, ambient light sensors, UV light sensors and LED sensors.

In various embodiments, the optical sensor is configured to measure the amount of ambient dust collected on the sample area using light scattering. In various embodiments, the optical sensor is configured to measure the amount of ambient dust collected on the sample area using backscattering. In various embodiments, the optical sensor is configured to measure the amount of ambient dust collected on the sample area using light absorption. In various embodiments, the continuous dust accumulation monitoring system may further include one or more local communication ports connected to the circuit board adapted to communicate with a computing device connected to the local communication port. For example, the local communication port may be an Ethernet, HDMI or USB port.

In various embodiments, the continuous dust accumulation monitoring system may include an alarm system connected to the circuit board, wherein the circuit board provides an alert signal to the alarm system when the dust accumulated on the sample area has exceeded a threshold. For example, the circuit board may provide an alert signal to the alarm system when the dust accumulated on the sample area has exceeded a threshold of about 1/32 inches (0.8 mm).

In various embodiments, the system as disclosed herein includes a machine vision subsystem employing one or more algorithms that can compute the thickness of dust on a measuring platform. The system can also include an impaired or dirty optics detection subsystem to assess when the optical component(s) are dirty and thereby trigger a cleaning alert and/or cleaning assembly.

The cleaning assembly can clean the optical component(s) and/or the surface of the sample area. The cleaning assembly can include a servo motor, a moving brush assembly and a magnetic drive. Alternatives to a servo motor can include a DC motor, stepper motor, solenoid or other form of motor, for example. In various embodiments, the cleaning assembly provides a top part having a frame with one or more brush elements on the radially external surface of the frame, wherein the frame is movingly securable within a portion of an enclosure for a dust accumulation platform. It will be appreciated that the material of the brush elements and cleaning assembly can be provided so as to avoid any static charge build up or other ignition hazard. In some embodiments, the automated cleaning assembly may utilize one or more mechanisms for removing accumulated dust off the surface area, such as acoustic, vibratory, airflow (e.g., via fans) and/or compressed air. For example, the automated cleaning assembly may be a vibration assembly that uses one or more high frequencies to cause the accumulated dust on the surface area to become airborne. An air pulse may be used in conjunction with the vibration assembly to remove the airborne and accumulated dust from the area, for example. The enclosure can be provided with one or more windows through which a camera can view and record images of the platform and any dust accumulated thereon. Images can be evaluated to assess dust measurements and the window(s) can be kept clean by the cleaning assembly as the brush element(s) are cycled over the window(s) to remove dust and debris that may prevent the camera from obtaining accurate images.

These and other aspects of the disclosure will become apparent to those skilled in the art after a reading of the following description of the embodiments when considered with the drawings.

BRIEF DESCRIPTIONS OF THE DRAWINGS

DETAILED DESCRIPTION OF EMBODIMENTS

The foregoing and other aspects of the present disclosure will now be described in more detail with respect to the description and methodologies provided herein. It should be appreciated that the disclosure can be embodied in different forms and should not be construed as limited to the embodiments set forth herein. Rather, these embodiments are provided so that this disclosure will be thorough and complete, and will fully convey the scope of the disclosure to those skilled in the art.

The terminology used in the description of the disclosure herein is for the purpose of describing particular embodiments only and is not intended to be limiting of the disclosure. As used in the description of the embodiments of the disclosure and the appended claims, the singular forms "a", "an" and "the" are intended to include the plural forms as well, unless the context clearly indicates otherwise. For example, a window can include one or more windows, a photodiode can include one or more photodiodes and so forth. Also, as used herein, "and/or" refers to and encompasses any and all possible combinations of one or more of the associated listed items.

As used herein, the terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

Figure 1A:
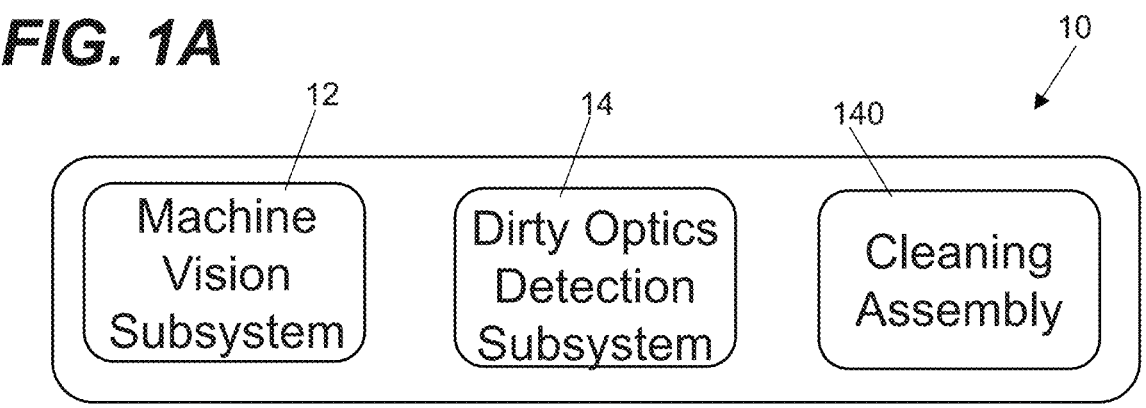
FIG. 1A is a schematic view of an embodiment of a continuous dust accumulation monitoring device according to the present disclosure.
Figure 1B:
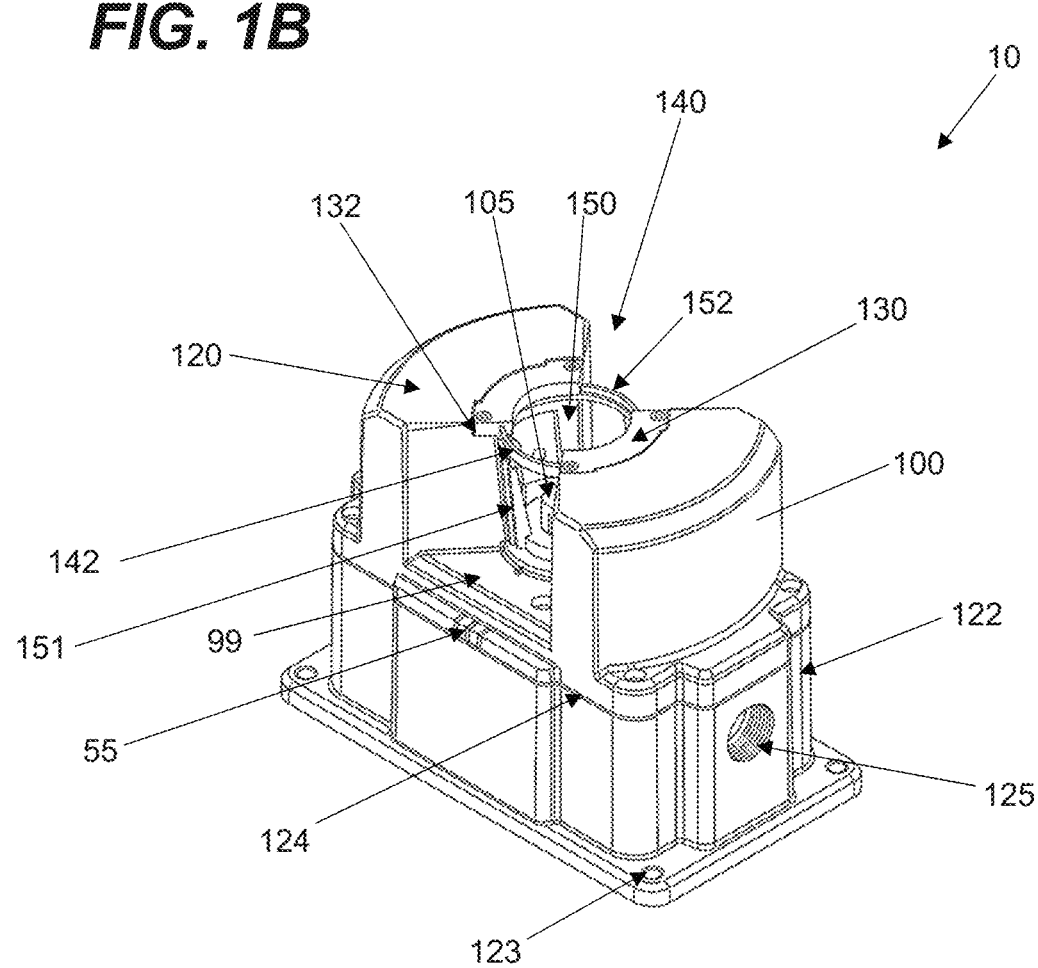
FIG. 1B is a perspective view of an embodiment of a continuous dust accumulation monitoring device according to the present disclosure.

In accordance with the present disclosure, a continuous dust accumulation monitoring system, device and method are provided. As shown in FIGS. 1A through 17, embodiments of a dust accumulation monitoring system 10 according to the present disclosure can include a machine vision subsystem 12, a dirty optics detection subsystem 14 and a cleaning assembly 140. As shown in FIG. 1B, the system 10 can include an enclosure 100 supporting a dust accumulation platform or sample area 105 for collecting ambient dust. The enclosure 100 has an external surface and a floor 99, and the sample area 105 is maintained proximate the floor 99 of the enclosure 100. In various embodiments, the sample area 105 includes a platform 89 elevated above the floor.

The enclosure can house or provide a supporting structure for the machine vision subsystem 12, a dirty optics detection subsystem 14 and a cleaning assembly 140. The machine vision subsystem 12 can include a camera (e.g., 112) with a lens 114 having a field of view of the sample area 105 or that includes the sample area 105. The machine vision subsystem 12 is operable to measure dust accumulation on the sample area 105. The lens 114 can be oriented adjacent the sample area 105 and adapted to capture images of the sample area 105 through a window 115.

The enclosure 100 can include an enclosure top 120 and an enclosure bottom 122 secured together by suitable mounting elements such as screws 121 (FIG. 3) that may extend through openings or through holes in the enclosure top 120 and into the enclosure bottom 122. A gasket or seal 124 can be provided between the enclosure top 120 and bottom 122 for sealing purposes, and the gasket 124 can be compressed when the screws 121 are secured. Ports 125 can be provided on one or both ends or elsewhere on the enclosure 100 to receive conduits or cable glands for attachment to the enclosure 100. Such conduits may house wires running to and from the enclosure 100. In various embodiments, the enclosure top 120 is provided with one or more passive dust protection eyebrows 130. The eyebrows 130 can be secured to a frame platform 132 of the enclosure top 120 such as by screws or the like and can be provided with an arc-shaped groove or track 133 for receiving and guiding a guide ring 152 at the top 142 of a cleaning assembly 140. The eyebrows 130 are secured above, and protect, one or more windows 115 of the device from dust and dirt buildup as they are positioned above the window(s) 115 and effectively block falling dust from above the eyebrows 130 from accumulating on the window(s) 115. The window 115 can be positioned between the camera lens 114 and the sample area 105.

The enclosure 100 may be configured to be UL/CSA certified for use in at least the following electrical hazardous categories: Class 1 Groups B, C and D; Class 2, Division 1, Subgroups E, F & G; Class 3 Type 4X; Class 1 Zone 1 AEx d IIC; and Ex d IIC IEC 60529 IP66. In various embodiments, the enclosure 100 may be an enclosure of various materials, shapes and sizes. For example, the enclosure 100 may be made of metal or plastic and may be configured as a rectangular prism and/or box-type shape. The enclosure 100 may further include a mounting assembly with openings 123 for mounting the enclosure 100 onto a surface.

Figure 2:
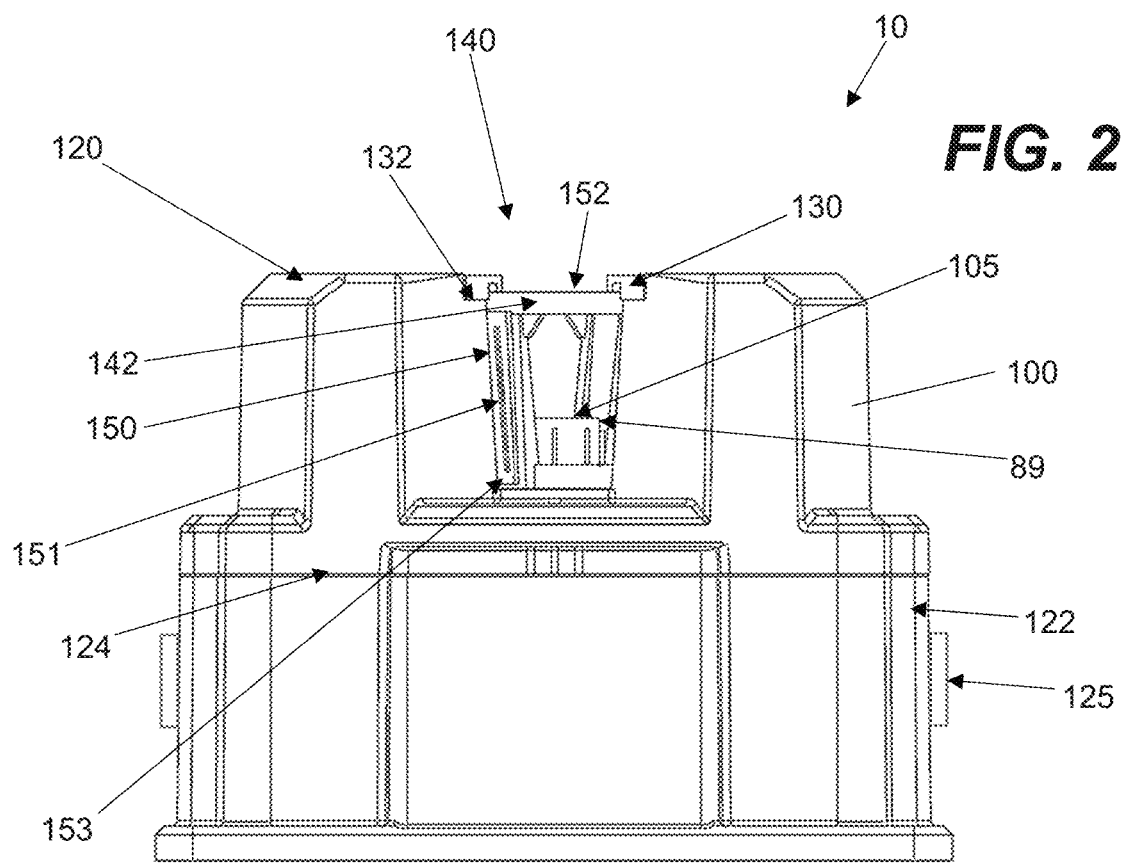
FIG. 2 is a front view of the device of FIG. 1B.
Figure 3:
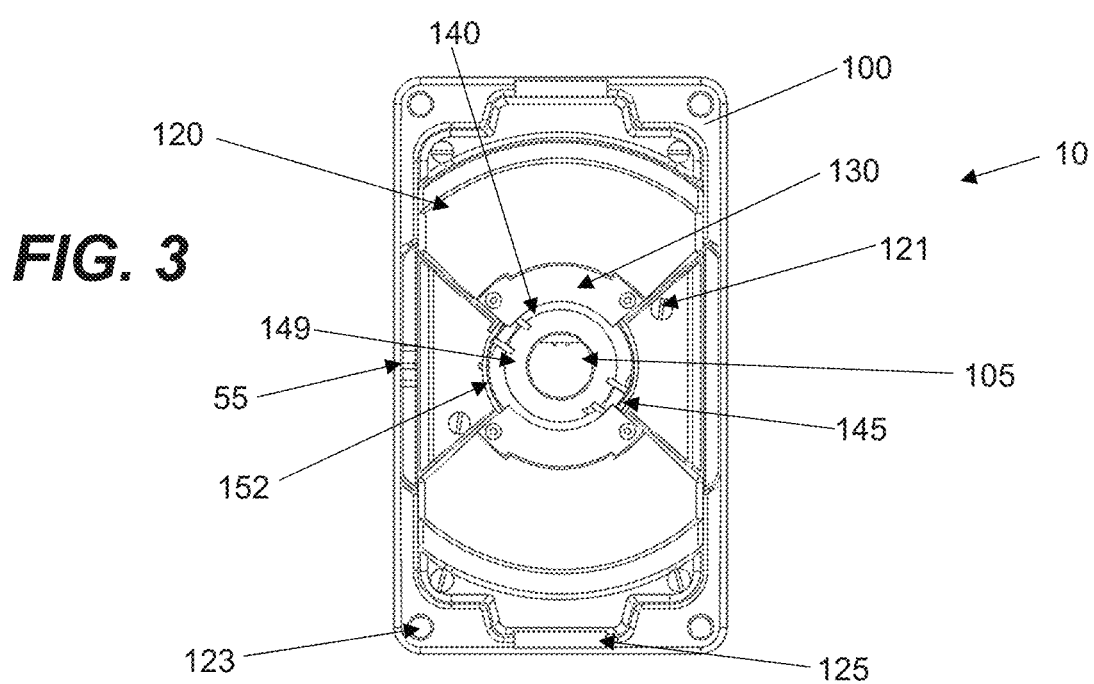
FIG. 3 is a top plan view of the device of FIG. 1B.

As seen in FIG. 2, the monitoring system 10 further includes a circuit board and/or main controller board 200. The circuit board may include a processor, memory, dry contact relays, fuses for 24 VDC power, attenuation filter, alarm circuits, one or more communication terminals, antenna fuses and embedded software. The embedded software may include functional blocks such as test and measurement orchestration, image processing, communication management, self-test and calibration, alarm generation/management, etc.

A backup battery system may also be housed inside the enclosure 100. Examples of communication terminals include 4-20 mA signal communication terminals, RS 485 communication terminals, Ethernet IP communication terminals, and wireless communication terminals such as RF communication terminals, Wi-Fi communication terminals, and Bluetooth communication terminals. In various embodiments, power can be provided exclusively via a primary battery system. A backup battery system can be employed regardless of whether primary power is via battery or a wired system to an electrical source such as a 24 VDC power supply.

An antenna may be attached to the exterior of the enclosure 100 for RF, Wi-Fi and/or Bluetooth communication to a network node. In some embodiments, such as where the enclosure 100 is made of plastic, a Wi-Fi antenna may be secured within the enclosure 100 instead of to the exterior of the enclosure 100. In one embodiment, the network node may comprise a wireless (or wired) repeater 30 and a wireless (or wired) router 50 (shown in FIGS. 9 and 10, respectively) located in a customer's control room. Embodiments of the exterior of the enclosure 100 can employ one or more wiring ports to allow 24 VDC power and communication cabling to be wired to the monitoring system 10. Additionally, the monitoring system 10 may include a local communication port located on the outside of the enclosure 100 for local computer connection. The local communication port may be tied into the circuit board 200 and enable customers to locally program and monitor each monitoring system 10 at an installed location. Visual status indicators 55 (e.g., LED lights) may be included to indicate various states of the continuous dust accumulation monitoring system, including but not limited to a power status, connection to wiring port and/or local communication port, connectivity to a PLC/server and an error/malfunction status.

One or more alarm systems may be in communication with the circuit board 200, wherein the circuit board 200 provides an alert signal to the alarm system when the dust accumulated on the sample area 105 has exceeded a threshold. For instance, the threshold may be defined by a dust height of about $\frac{1}{32}$, $\frac{1}{16}$ or $\frac{1}{8}$ inches. The thresholds may be predefined by a manufacturer or adjusted by an end-user. In one embodiment, the alarm system may include a sound alarm such as a piezo alarm.

In various embodiments, the system and device may be adapted to accurately measure dust accumulation level between the range of 0 inches to 1 inch and 0 mm to 25 mm and monitor dust particles in the range of 300 to 0.05 microns.

In some embodiments, a digital camera may be used in combination with one or more sensors to measure and/or verify the amount of accumulated dust on the sample area. For example, a digital camera and laser may be used. In some embodiments, the digital camera may also be configured to measure additional properties of dust in the environment. For example, the digital camera may be configured to measure the size of dust particles and/or the concentration of dust that is airborne near the sample area.

In some embodiments, the circuit board 200 may further include software utilizing machine/computer vision and machine learning to automatically detect when the dust height reaches and/or exceeds a dust level threshold. The continuous dust accumulation monitoring system 10 may include a screen (e.g., LCD, LED, OLED, etc.)

The continuous dust accumulation monitoring system 10 may further include one or more automated cleaning assemblies configured to remove accumulated dust from the sample area 105 and/or window(s) 115. In some embodiments, the automated cleaning assembly may utilize one or more mechanisms for removing accumulated dust off the surface area, such as acoustic, vibratory, airflow (e.g., via fans) and/or compressed air. For example, the automated cleaning assembly may be a vibration assembly that uses one or more high frequencies to cause the accumulated dust on the surface area to become airborne. An air pulse may be used in conjunction with the vibration assembly to remove the airborne and accumulated dust from the area.

In some embodiments, the continuous dust accumulation monitoring system further includes one or more additional sensors configured to measure additional properties in the ambient area. For example, sensors may be employed to measure the humidity, airflow, pressure and/or temperature of the surrounding environment.

In operation, the system 10 is adapted to continuously measure dust levels as it accumulates on the sample area 105 and relay this information via hardwire communication (4-20 mA signal, RS-485 or Ethernet IP, for example) and/or wireless communication using RF, Wi-Fi or Bluetooth to a wireless repeater 30 or a central wireless router 50 located at a remote location such as a control room, for example. One or more wireless repeaters 30 may be installed at a location to relay signals from individual monitoring systems 10 to a central wireless router in a control room, for example, if signal interruptions are detected between the monitoring system 10 and a central wireless router 50.

Figure 9:
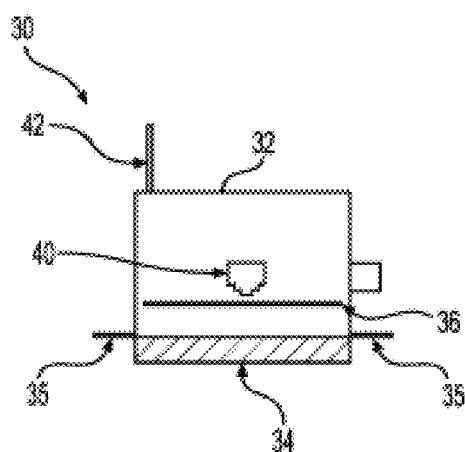
FIG. 9 is a side elevation view of a wireless repeater according to one embodiment.

FIG. 9 depicts one embodiment of a wireless repeater 30 with a circuit board 36 adapted to relay wireless signals from monitoring system 10 back to a central wireless router 50. The wireless repeater 30 may be encased in a metal enclosure 32 with two access ports. One port may be configured for accepting an incoming 24 VDC power supply to the wireless repeater 30. The second port may be a communication port 40 located on the outside of the enclosure 32 for connecting the circuit board 36 to a local computer. The wireless repeater 30 may further include an antenna 42 connected to a circuit board 36 and mounted externally to the metal enclosure 32. The enclosure 32 may further include a mounting assembly 34 with holes 35 for mounting the enclosure 32 onto a surface.

Figure 10:
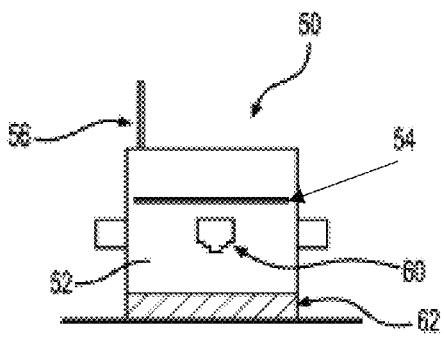
FIG. 10 is a side elevation view of a wireless router according to one embodiment.

FIG. 10 illustrates one embodiment of a central wireless router 50 adapted to communicate with a wireless repeater 30 and/or monitoring system 10. The wireless router 50 includes an enclosure 52 having the same UL/CSA certifications as the monitoring system 10. The enclosure 52 may further include a mounting assembly 62 with holes for mounting the enclosure 52 onto a surface. A built-in circuit board 54 installed in the enclosure may be embedded software to allow RF, Wi-Fi and Bluetooth communication with the wireless repeater 30 and/or monitoring system 10 via antenna 56. The central wireless router 50 may also include a communication port 60 configured to receive hardwired communication via 4-20 mA, RS 485, Ethernet IP. The wireless router 50 may also be connected to the internet allowing data to be routed to system control. Additionally, the circuit board 54 may include an attenuation filter, a power source and antenna fuses.

Once the wireless router 50 receives data from the monitoring system 10 or wireless repeater 30, the wireless router 50 may use an internet connection to move the sensor data to a system control comprised of system control software and system control hardware. In one embodiment, the system control software may include software components such as a data acquisition system (e.g., sensor data including dust, temperature, humidity, pressure, airflow, etc.), data analysis, database and database management, predictive maintenance, and interfacing with other industrial systems. In various embodiments, the system control hardware may be a server. For instance, the server may be at a location such as an enterprise data center or may be cloud-based.

A user can login to the server remotely and program individual monitoring systems 10 and adjust device alarm parameters. Users may also remotely monitor average dust accumulations over specific areas or zones or at individual monitoring system units. The system control software may also be adapted to allow users to route data back from the server to a plant or corporate server.

In various embodiments, each sensor is adapted to be programmed to setup alarm thresholds when average dust accumulation levels reach unacceptable levels. For example, two dry contact relays on the circuit board 200 can be used to activate horns, light or turn on and off equipment near the individual sensor. Additionally, system control software can be configured to alert plant and corporate personnel when alarm levels are reached. Data analytic tools can also be used to analyze dust accumulation data using the system control software. In some embodiments, the system control software may have functional blocks including AI machine learning, predictive maintenance, data analytics and visualization, for example. The system control software may further be configured to perform system-level tasks such as system testing and calibration, database management, interface and integration with other industrial systems (including alarm and monitoring systems), interface and integrate with mobile devices, for example. The system control software may be configured to perform regulatory compliance task automation, including required record keeping and form generation, for example.

The system control may be configured to determine the rate of change of dust accumulation over set time intervals and graph the dust accumulation to determine if the rate of change is steady, linear or exponential so that a facility may make inferences about the functioning of equipment in a room where the continuous dust accumulation monitoring system is installed. For example, an equipment malfunction may be indicated by a sudden change in the rate that dust accumulates on a sample area. For instance, a dust accumulation system that typically accumulates 1/64" (0.4 mm) of dust over three months may experience a sudden accumulation of dust having a height of about 0.25" over two hours, which may indicate an equipment malfunction nearby the dust accumulation monitoring system (e.g., a loose hose).

Figure 4:
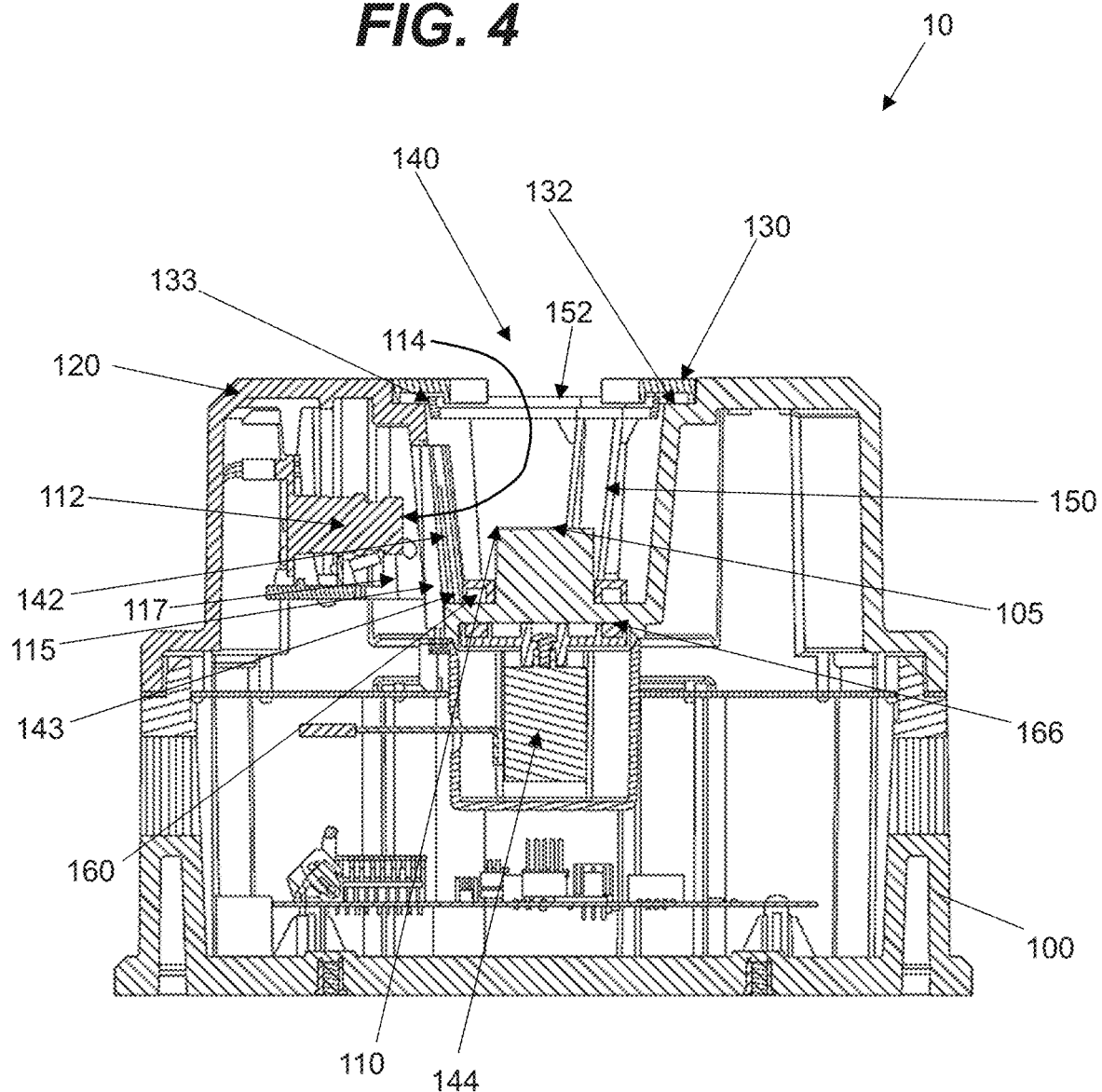
FIGS. 4 and 5 are front cross-sectional views of embodiments of a continuous dust accumulation monitoring device according to the present disclosure.
Figure 5:
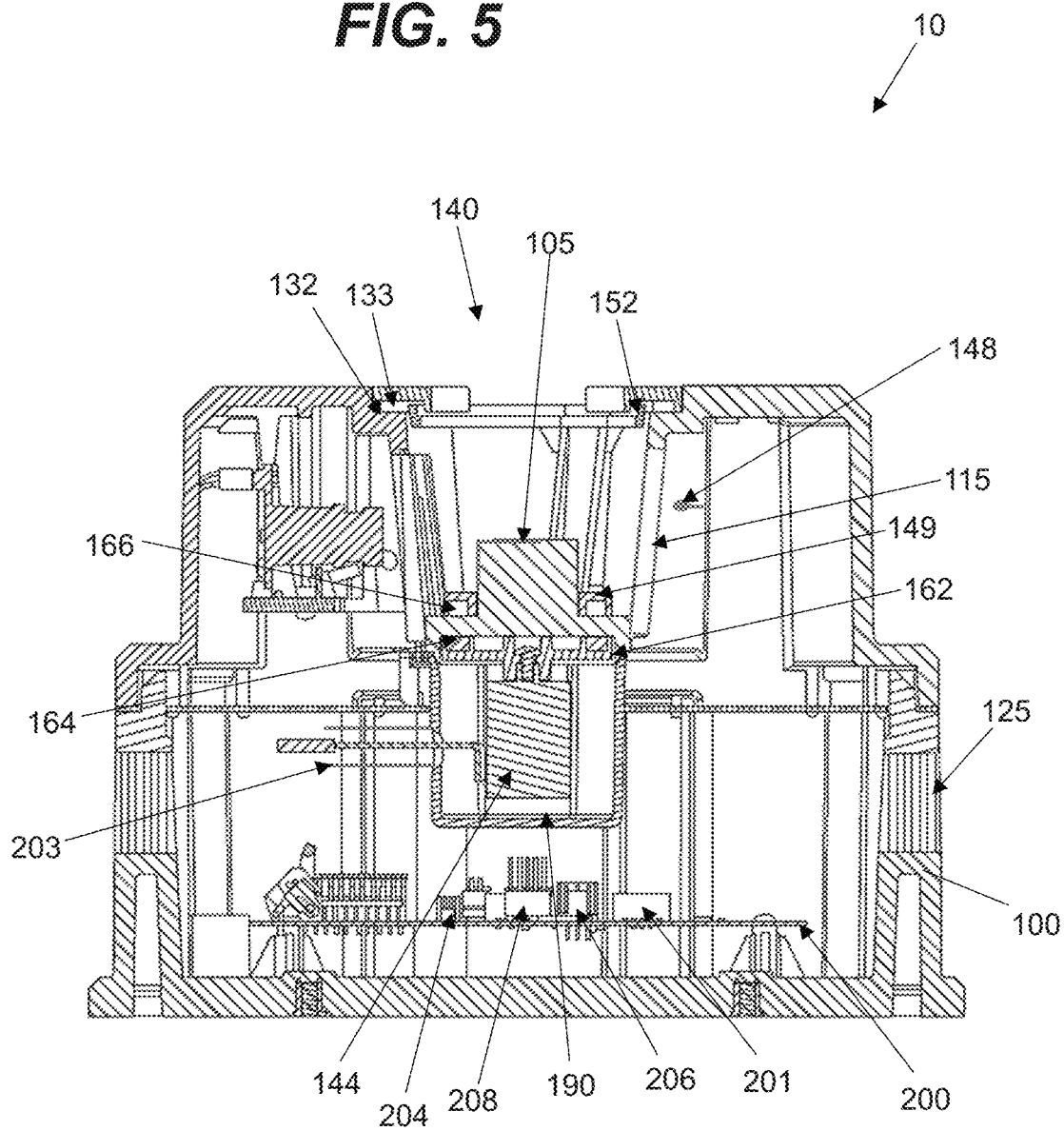
Figure 6:
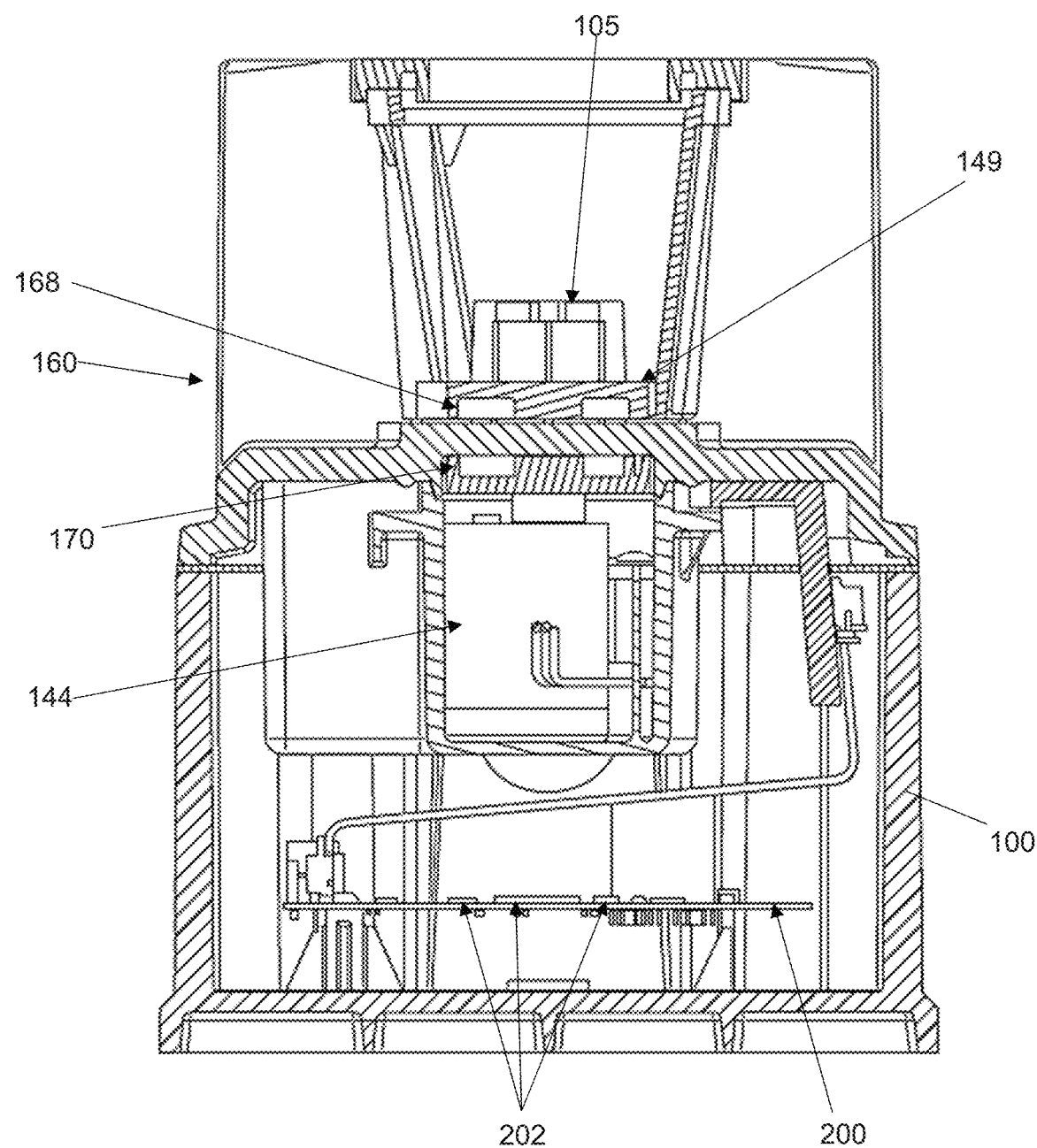
FIG. 6 is a side cross-sectional view of the device of FIG. 1B.
Figure 7:
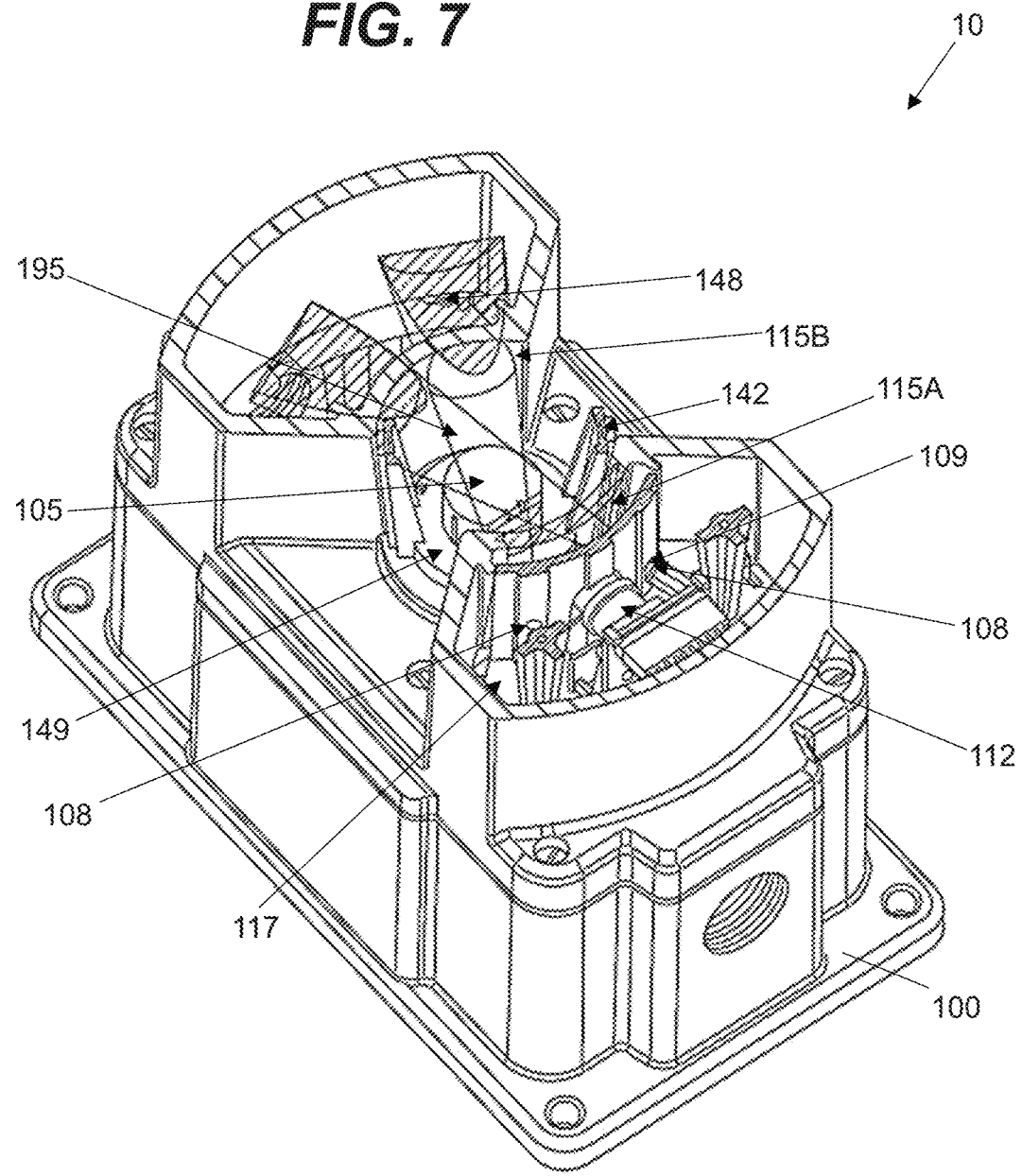
FIG. 7 is a perspective view of the device of FIG. 1B with top cover removed.
Figure 8:
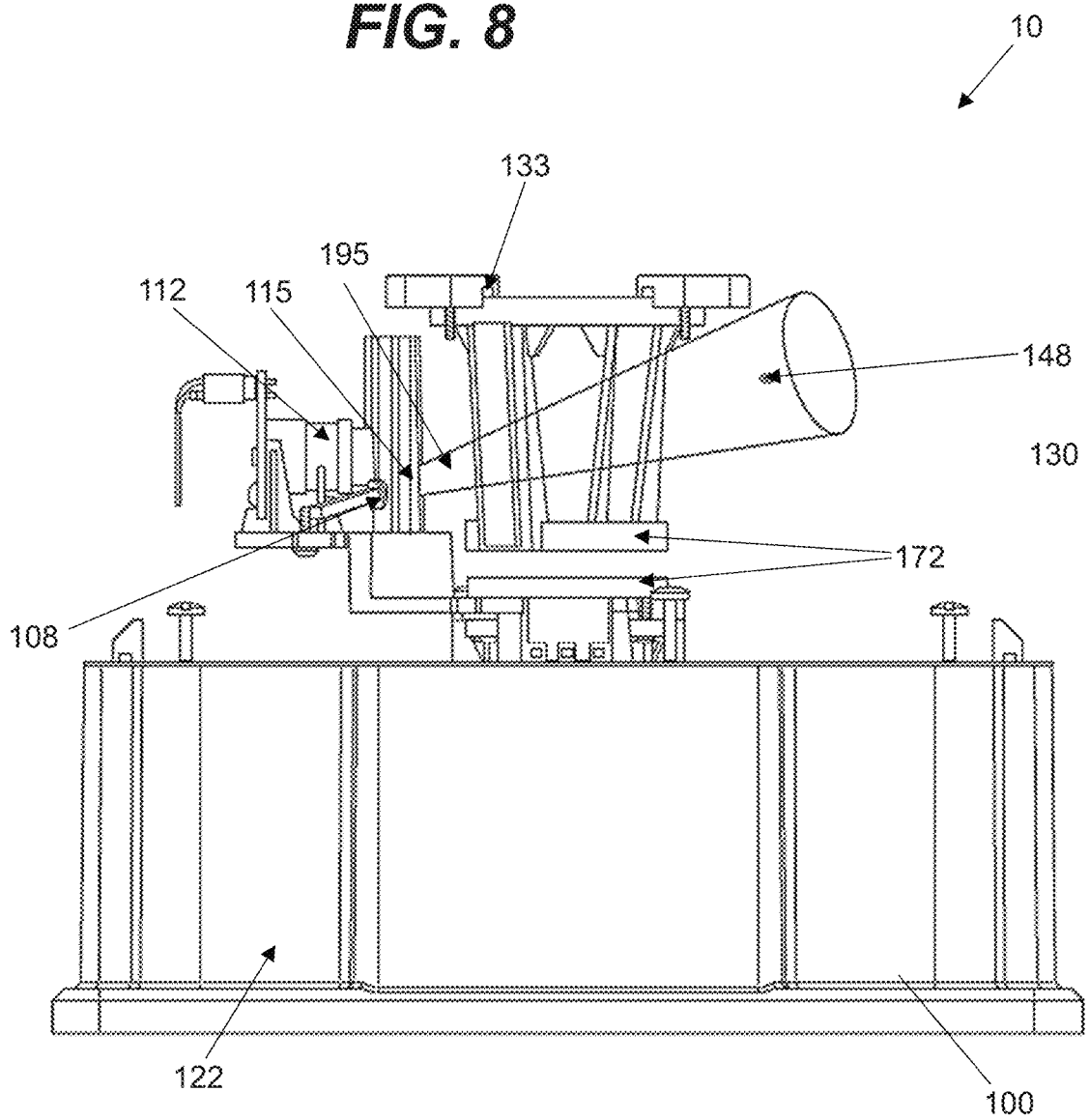
FIG. 8 is a front view of the device of FIG. 1B with top cover removed.

As illustrated in FIGS. 7 and 8, the dust accumulation platform or sample area 105 can be illuminated by multiple light emitting diodes (LEDs) 108 arranged in a spaced relation. The LEDs 108 may emit light through openings 109. In various embodiments, the LED colors are determined for maximum contrast. As shown in FIG. 4, the platform 105 can be provided with an edge 110 that assists in providing contrast to the system as the dust measurements are taken. In other embodiments, a backlighting LED is provided for contrast or a stationary device such as a sticker is provided for contrast on the backwall. A camera 112, such as a digital camera, and lens 114 can be oriented horizontally adjacent to the dust platform 105 for recording photographs of the dust platform 105 from the side. One or more machine vision algorithms can be provided as part of the machine vision subsystem 12 to report the depth of the dust from near-zero accumulation to several times the alert threshold.

In various embodiments, fiducial marks can be provided on or adjacent the platform 105 for calibration purposes.

It will be appreciated that the machine vision subsystem 12 can identify the difference in camera pixels between the edge 110 of the dust platform 105 and the top of the accumulated dust, compute the thickness of the dust using geometry and the known physical lens 114 and camera 112 image sensor properties, perform an automatic calibration and optionally use available fiducial marks to calibrate. The machine vision subsystem can also sense several locations on the platform 105 to compute a dust thickness. In various approaches, the color of the LEDs is varied to contrast with the anticipated dust color. Also, one or more lasers can be employed instead of LEDs. FIGS. 7 and 8 illustrates the LED light 195 bathing a photodiode 148 through a window 115. As shown in FIG. 7, for example, a first window is shown as at 115A, and a second window 115B is positioned on an opposite side of the sample area 105 from the first window 115A, wherein the light source 108 is positioned within the enclosure 100 behind the first window 115A.

In various embodiments, a dirty optics detection subsystem 14 is provided. The dirty optics detection subsystem is in communication with the camera and is operable to detect an optical clarity level of the field of view. In various embodiments, the dirty optics detection subsystem 14 can include a light source, a dirty optics sensor such as a photodiode and one or more algorithms. The algorithm(s) can be embodied as programming to receive input from the machine vision subsystem 12, wherein the input includes one or more measurements taken as the dirty optics sensor is exposed to the light source through one or more windows 115 of the dust accumulation monitoring system and, upon the input being determined to meet or exceed a threshold, produce an alert signal. The dirty optics detection subsystem 14 can provide a signal to trigger the cleaning assembly 140 without operator intervention, which assists in obtaining continuous and accurate measurements of dust accumulation. The dirty optics detection subsystem 14 can provide alerts at various times, such as, for example, when the optics become dirty, when the cleaning assembly 140 operates yet fails to clean the dust from the lens and when or before the dust accumulation monitor algorithm produces erroneous readings. The dirty optics detection subsystem 14 can include the LEDs 108 and camera 112 as described above in connection with the dust accumulation monitoring. In various embodiments, the dirty optics detection subsystem 14 can further include another light source and a photodiode (e.g., 148).

The alert signal can involve invoking the cleaning assembly 140 to clean the window and/or lens. In various embodiments, the dirty optics sensor is the photodiode 148 and the machine vision subsystem is the camera 112. In various embodiments, the camera acts as the photodiode (i.e., the dirty optics sensor) in the sense that the camera essentially provides over a million photodiodes (i.e., pixels) in a very small area. In various embodiments, instead of the photodiode looking at the light reflecting from dust on the window, an exposure function of the camera can be employed. For example, the auto-exposure function of the camera can overexpose or fully expose the dust cake on the sample area. An associated auto-exposure algorithm can provide a confidence measure related to optical clarity. As the camera has over a million pixels in it, more data is available to improve assessments of optical clarity than with a single photodiode. It will be appreciated that fixed features of known placement and dimensions within the region of interest of the camera such as fiducial marks can also be used by the algorithm(s) to assess optical clarity.

The alert signal can also alert a user to decide whether to invoke the cleaning assembly. In various embodiments, the alert signal can alert a user that the cleaning assembly is not sufficiently operating to clean a surface such as a window or lens, in which case the user may employ alternative cleaning methods including potentially manual cleaning.

As shown in FIGS. 1B through 6, the cleaning assembly 140 according to the present disclosure can include a servo motor 144, a rotating brush assembly 145 and a magnetic drive mechanism 160. The servo motor 144 can be maintained within a sealed container or pocket 190 in various embodiments. According to embodiments, the act of cleaning can be triggered by an alarm from the dirty optics sensor (e.g., photodiode 148 or camera 112) or can be triggered on a scheduled basis or by the operator from the device website. It will be appreciated that the cleaning assembly 140 does not necessarily clean the platform but embodiments of the cleaning mechanism can incorporate a small mechanical modification such as a rod with a brush to be able to clean the platform. In various embodiments, the photodiode 148 is positioned on the opposite side of the table from the camera, whereas in other embodiments the photodiode 148 is positioned on the same side of the table as the camera. In the latter embodiments, the way the photodiode works is reversed because, as dust accumulates, the LEDs internal to the window reflect their light and the inside of the enclosure becomes brighter.

The cleaning assembly 140 can include a frame with a top part 142 and a bottom part 143. The top part 142 can include the rotating brush assembly 145 with substantially vertical frames 150 and the guide ring 152 that is adapted to slidingly engage and/or rotate through the track 133 of the eyebrows 130 during operation. The vertical frames 150 are spaced apart and create openings positionable between the lens and the sample area 105 which can align with one or more inwardly facing windows 115 in the enclosure top 120 that permit the camera 112 to view the accumulated dust during operation. The windows 115 can be formed of a polycarbonate or other optically clear material in certain embodiments and can act as a seal along with an electronics insert or cradle 117 to prevent dust and other outside elements from entering an area in the enclosure top 120 that protects internally maintained electronics, such as the camera 112 and LEDs 108, for example. The top part 142 of the cleaning assembly 140 can also be provided with a base 149, and the base 149 can be provided with an opening so as to be positionable over and around the platform or sample area 105. A brush 151 with brush material such as hook and loop (e.g., Velcro™) material, foam, anti-static material and other material can be secured to the radially outer surfaces 153 of the vertical frames 150 to properly brush dust and/or other material off of the windows 115 during operation of the device. It will be appreciated that the term "brush" can encompass other cleaning media besides strictly brush material.

The bottom portion of the cleaning assembly 140 can include a magnetic coupling and drive system 160, which can include a magnet holder/servo "horn" 162, a mating magnetic ring drive 164, a bearing washer 166 positioned to limit friction between an upper magnet 168 and a lower magnet 170. The bearing washer 166 can be provided as an ultra-high molecular weight (UHMH) washer in various embodiments. Top and bottom magnet holders 172 are also provided as shown in FIG. 8. It will be appreciated that embodiments of the device and system can be employed only with non-magnetized dusts.

As part of the cleaning mechanism, the servo 144 can be provided with a "home" position which keeps the brush(es) 151 out of the optical view of the camera 112. According to various embodiments, the servo 144 can rotate both ways and can be replaced with a stepper or DC motor if desired. It will be appreciated that the servo 144 provides positional accuracy.

In various embodiments, the cleaning assembly 140 can include a magnetic drive system instead of a geared servo that punctures the enclosure. However, a geared servo for turning the cleaning assembly can be employed. It will be appreciated that other approaches to window cleaning can be employed, including vibration, impact, and air methods. However, such approaches may vary in degrees of success. It will be appreciated that the magnetic drive system assists in the dusty environments in which the system and device of the present disclosure is employed, as the magnetic drive system employs no penetrating shaft that can permit dust ingress. It will be appreciated that mechanical drive systems can be employed in lieu of the magnetic drive system, according to certain embodiments of the present disclosure.

The cleaning assembly 140 is in communication with the dirty optics detection subsystem 14, and the cleaning assembly is movably secured to the enclosure 100 and operable to clean an impediment from the field of view. The impediment can be dust, dirt or another form of impediment, and the field of view can be obscured based upon an impediment on a window or on the camera lens itself. In various embodiments, the cleaning assembly 140 is operable to move such that the brush 151 engages the window as the guide ring 152 of the cleaning assembly 140 slides through the groove 133.

The light source for the dirty optics detector can be LED 108, laser light, UV light or IR light, for example. The LEDs 108 can be pulsed in a way instead of just using total light level to detect how dirty the optics are. An analog signal from the photodiode can be interpreted against a threshold, which can be set via the device website, for example. The dirty optics detection subsystem 14 determines an optical clarity level. In various embodiments, the system 10 can compare the optical clarity level from the dirty optics detection subsystem 14 with a threshold for cleaning to determine if the optical clarity level meets or exceeds the threshold for cleaning. Further, upon the optical clarity level being determined to meet or exceed the threshold for cleaning, the system can invoke the cleaning assembly to clean the impediment from the field of view.

The enclosure bottom 122 can house the main controller board 200, power terminal blocks 201, communication terminal blocks 202, a cable gland 203, peripheral connections 204 for the LEDs, camera, etc., an Ethernet jack 206 and a wireless antenna 208, for example, for operation as described elsewhere herein.

It will be appreciated that embodiments of the present disclosure include one or more machine vision algorithms as part of the machine vision subsystem 12 for quantifying the cleanliness of the optical window 115. This quantification can be considered an optical clarity level and/or a confidence level. For example, a higher optical clarity level may result in a higher confidence that the measured dust accumulation level is accurate whereas a lower optical clarity level may indicate a lower confidence level in the measured dust accumulation level. The algorithm(s) can be used to compare values from the dirty optics sensor for higher fidelity of pictures taken, thereby improving accuracy of measurements over a continuous period of time and improving validity of alerts associated with the present disclosure.

Figure 17:
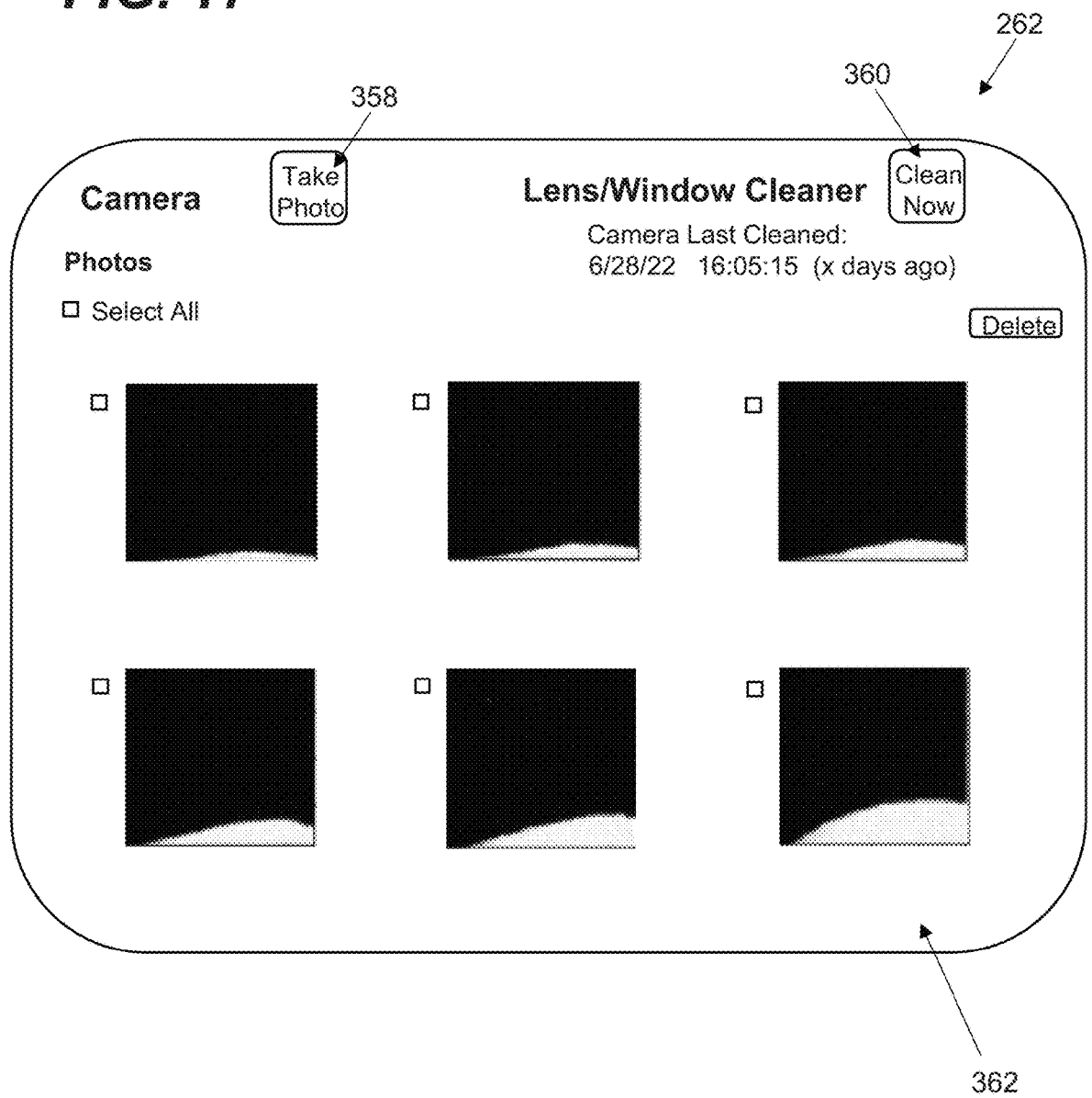

It will be appreciated that the continuous dust accumulation monitoring system as disclosed herein provides an "alarm" threshold that can be adjusted by the end user, wherein the device can still monitor above the alarm threshold, thereby providing a fully continuous monitor. In various embodiments, a threshold for an alert for dust accumulation, cleaning or optical clarity can be a confidence measure or can include a confidence measure, indicating the degree of confidence associated with a measurement. For example, a confidence threshold can be established along a scale from one to ten, with ten being the highest confidence. A user may establish a confidence threshold of six, for example, such that if the threshold is exceeded to the downside (i.e., below a six), this is an indication that the system has a lower confidence in a measurement such as an optical clarity level. If the system has a lower confidence in an optical clarity level, then the dust accumulation measurement may not be highly accurate or reliable, which could lead to false assessments of high or low dust accumulation. As such, if the confidence threshold is exceeded in the sense that the confidence measurement is below the set confidence threshold, then the user may trigger the cleaning function such as by selecting an icon 360 as shown in FIG. 17.

In various embodiments, if the optical clarity-based confidence level is low, the user may manually trigger a cleaning cycle, or the automated system can trigger a cleaning cycle. Further, if the servo-based cleaning cycle is ineffective, such as if a significant dust event has occurred and the monitor is buried or extremely obscured by the dust, the alarm can indicate that a technician needs to be dispatched to manually clean the unit.

In operation, the camera 112 can take photographs at intervals established by a user. The sampling rate can be set to once per minute, for example, but can be adjusted to different rates. It will be appreciated that the passive eyebrow(s) 130 limits dust accumulation on the window(s) 115 and can greatly reduce the buildup on optical surfaces, regardless of whether the cleaning assembly 140 is employed. The 4-20 mA interface 202 allows the device to be easily monitored by a Programmable Logic Controller (PLC). The Ethernet port 206 allows the device to be easily monitored by a cloud-based data acquisition system, for example. The optical field of view of the camera can be of varying sizes according to the size of the camera 112.

The device electronic interface (accessible as a webpage over the Internet, for example) can allow a user the option to directly observe a photograph of the dust platform before or after an alerting event. The device can also offer a dry contact closure so that nearby devices can be directly connected and operate when an alerting event occurs.

Figure 11:
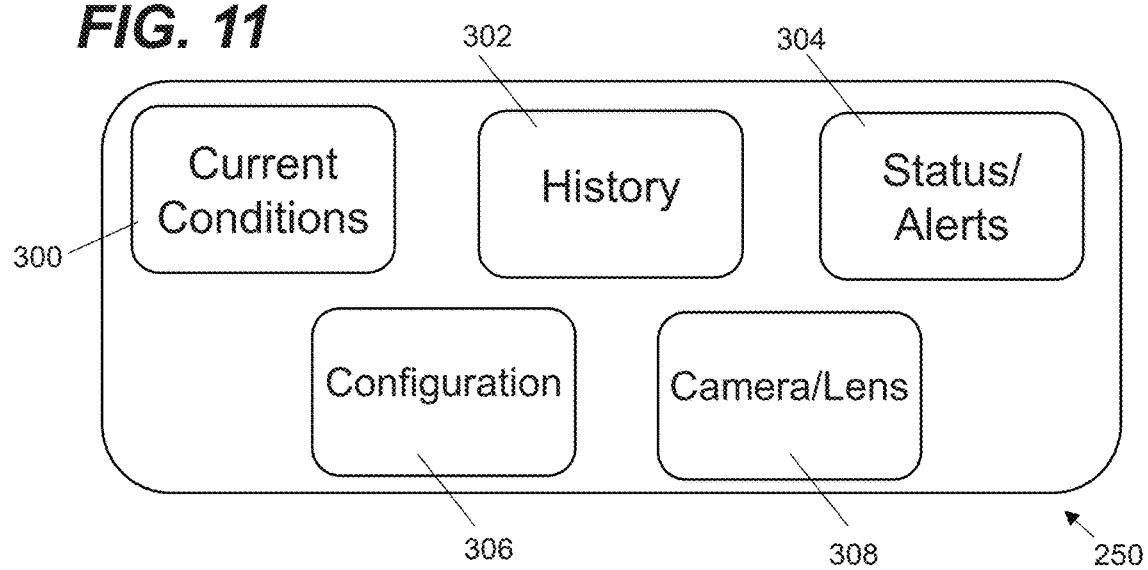
FIGS. 11 through 17 are example user interfaces associated with embodiments of the present disclosure.

In various embodiments, a device electronic user interface can include a home page such as illustrated at 250 in FIG. 11, for example, representing and/or permitting access to current system conditions 300, device history 302, status and alerts 304, configuration 306 and camera/lens matters 308. Upon selecting the current conditions as at 300, the device interface as at 252 in FIG. 12 can display a network connection strength as at 310, the current dust level (e.g., in inches and/or mm) as at 312, an evaluation of the status of the current dust level as at 314, the current dust level as a percentage of the alarm threshold (e.g., as a graphical gauge 316) and the current optical clarity based on the dirty optics subsystem evaluation (e.g., as a qualitative measure as at 318 and/or as a percentage of desired clarity as at 320).

Figure 12:
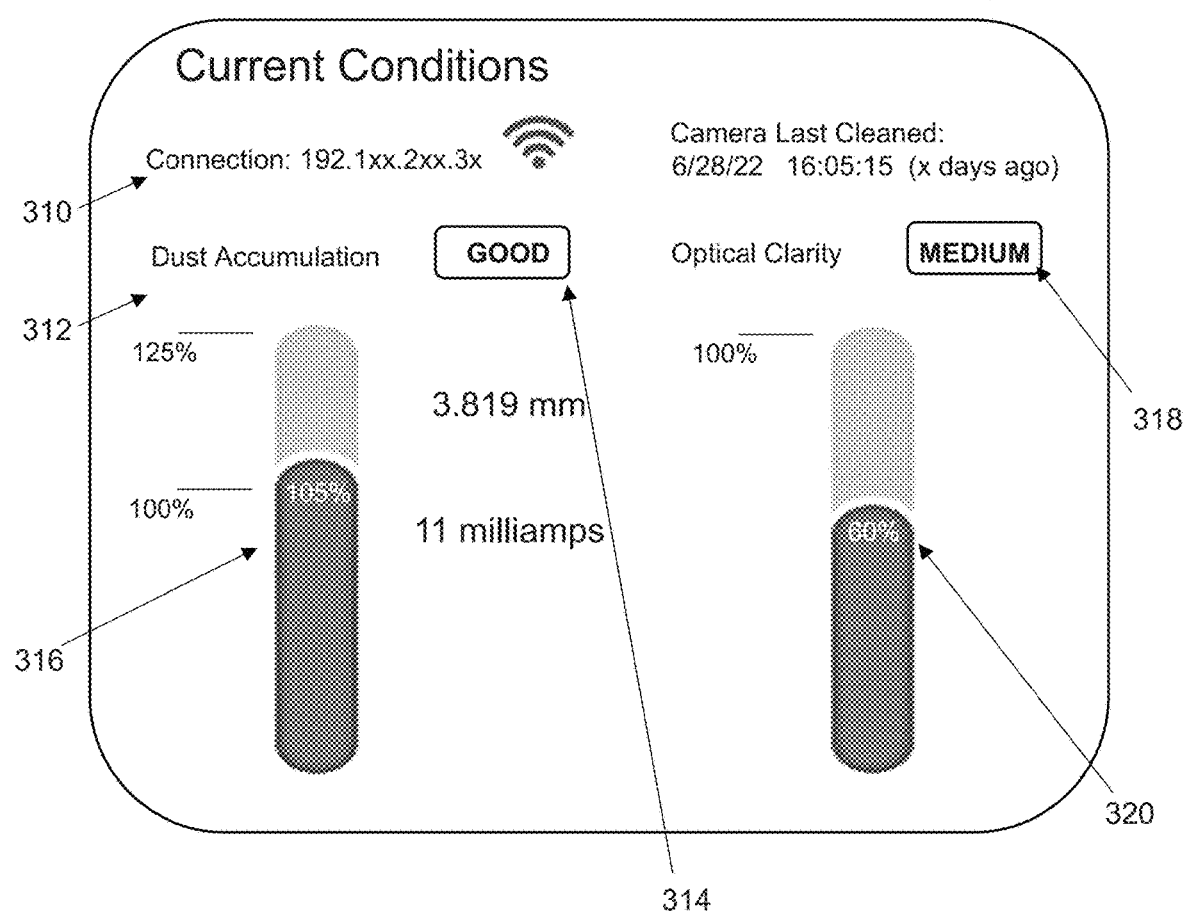

It will be appreciated that the system 10 can compare the optical clarity level from the dirty optics detection subsystem 14 with a threshold for cleaning to determine if the optical clarity level meets or exceeds the threshold for cleaning. As shown in FIG. 12, the optical clarity level 318 is determined to be sixty percent and/or at a "Medium" level. If the optical clarity level (whether quantitative or qualitative) is determined to meet or exceed the threshold for cleaning, the system can invoke the cleaning assembly to clean the impediment from the field of view. It will be appreciated that meeting or exceeding a threshold can be according to a user-established threshold. For example, if a clarity level is deemed "low", that may meet or exceed the threshold. Or if a clarity level is fifty percent of what is considered to be clear, that may meet or exceed the threshold. As a further example, a threshold of fifty percent clear is considered to be met when the optical clarity level is fifty percent and exceeded when the optical clarity level is below fifty percent clear.

Figure 13:
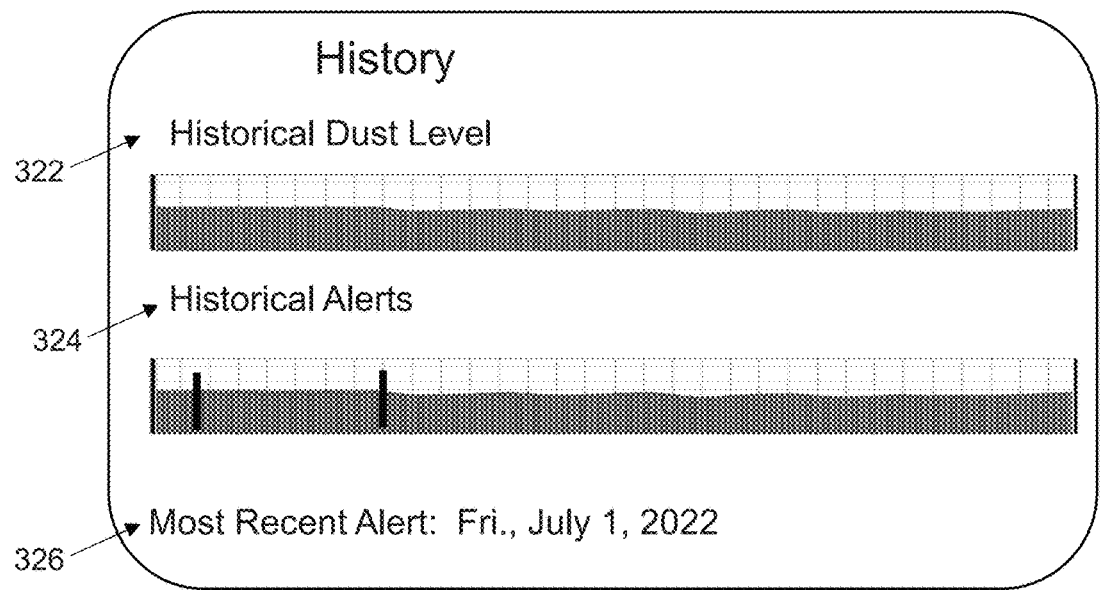
Figure 14:
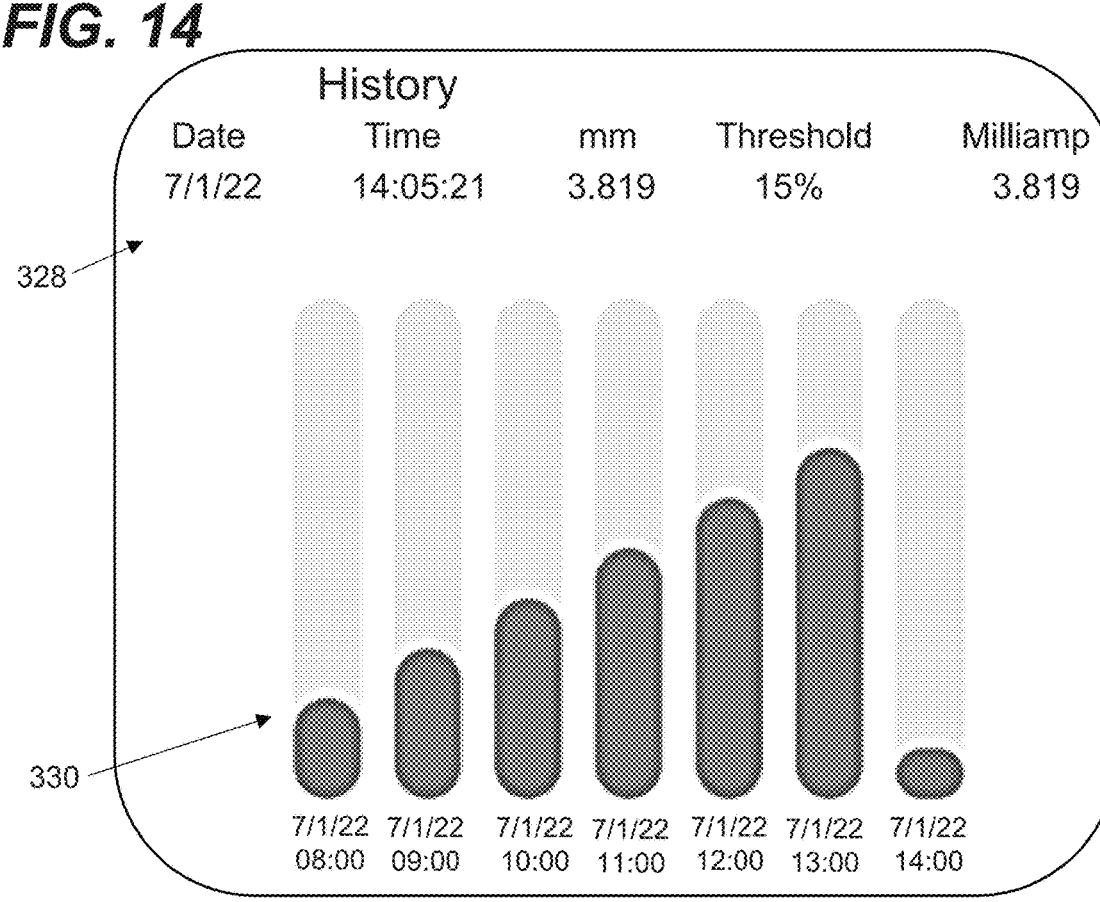

Upon selecting the history as at 302 in FIG. 11, the device interface as at 254 in FIG. 13 can display a history of the dust level over a period of time (e.g., the last seven days) as at 322, all alerts for a period of time (e.g., the last seven days) as at 324 and the last time the cleaning mechanism was triggered as at 326, for example. In various embodiments, the history interface can be presented as at 256 in FIG. 14, including a listing of factors such as the date, time, measurement level, threshold and milliamp measurement as at 328, and/or a graphical display showing the measured level at different dates and/or times as at 330.

Figure 15:
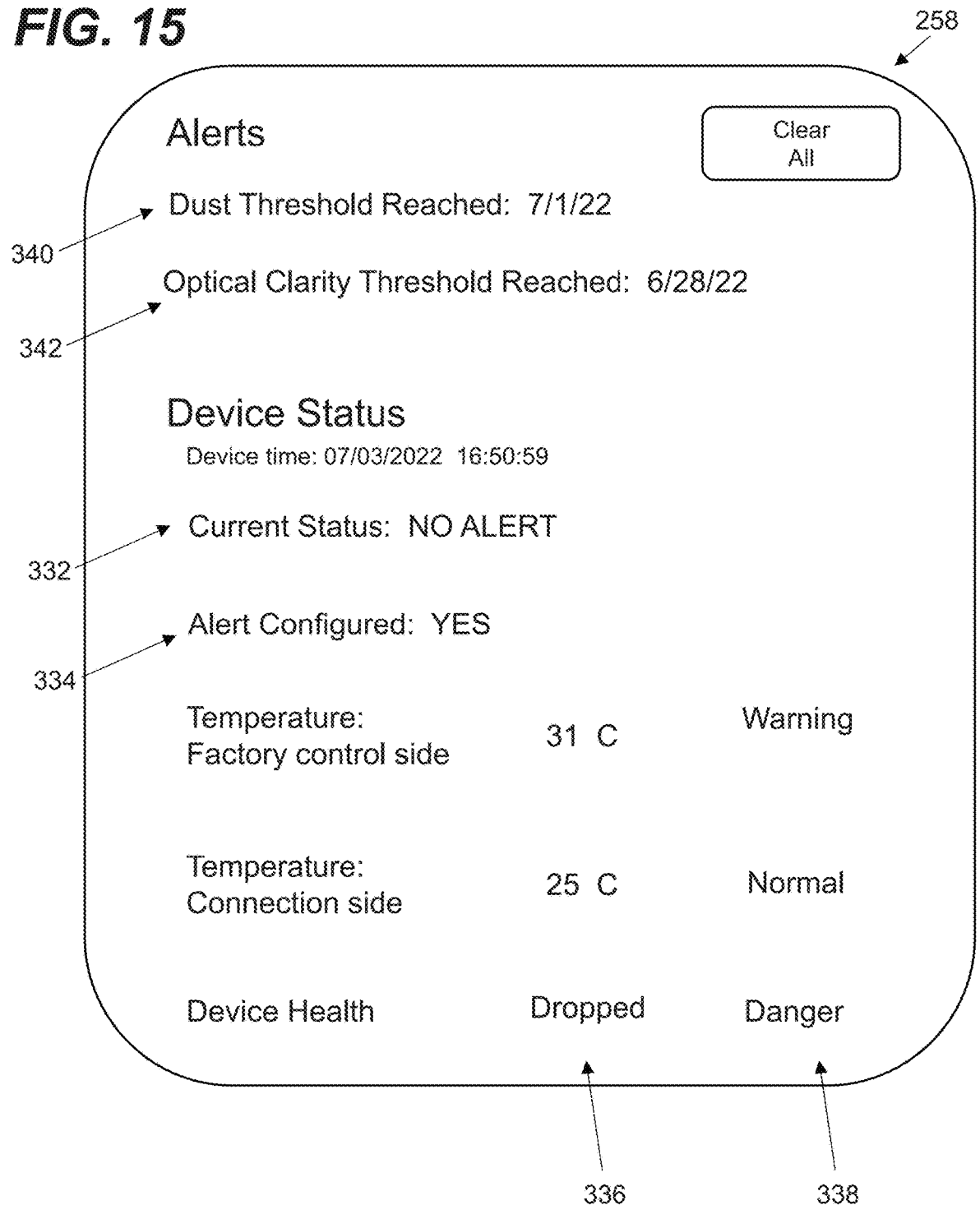

Upon selecting status and alerts as at 304 in FIG. 11, the device interface as at 258 in FIG. 15 can display a current alert status (e.g., alert/non-alert and/or a form of signal indicating whether an alert setting has been configured) as at 332, whether an alert has been configured as at 334, measurements as at 336 and corresponding alert levels as at 338, alert history for dust accumulation as at 340 and alert history for optical clarity as at 342. It will be appreciated that the device can be provided with environmental sensors according to various embodiments, including temperature, pressure and humidity sensors, for example.

Figure 16:
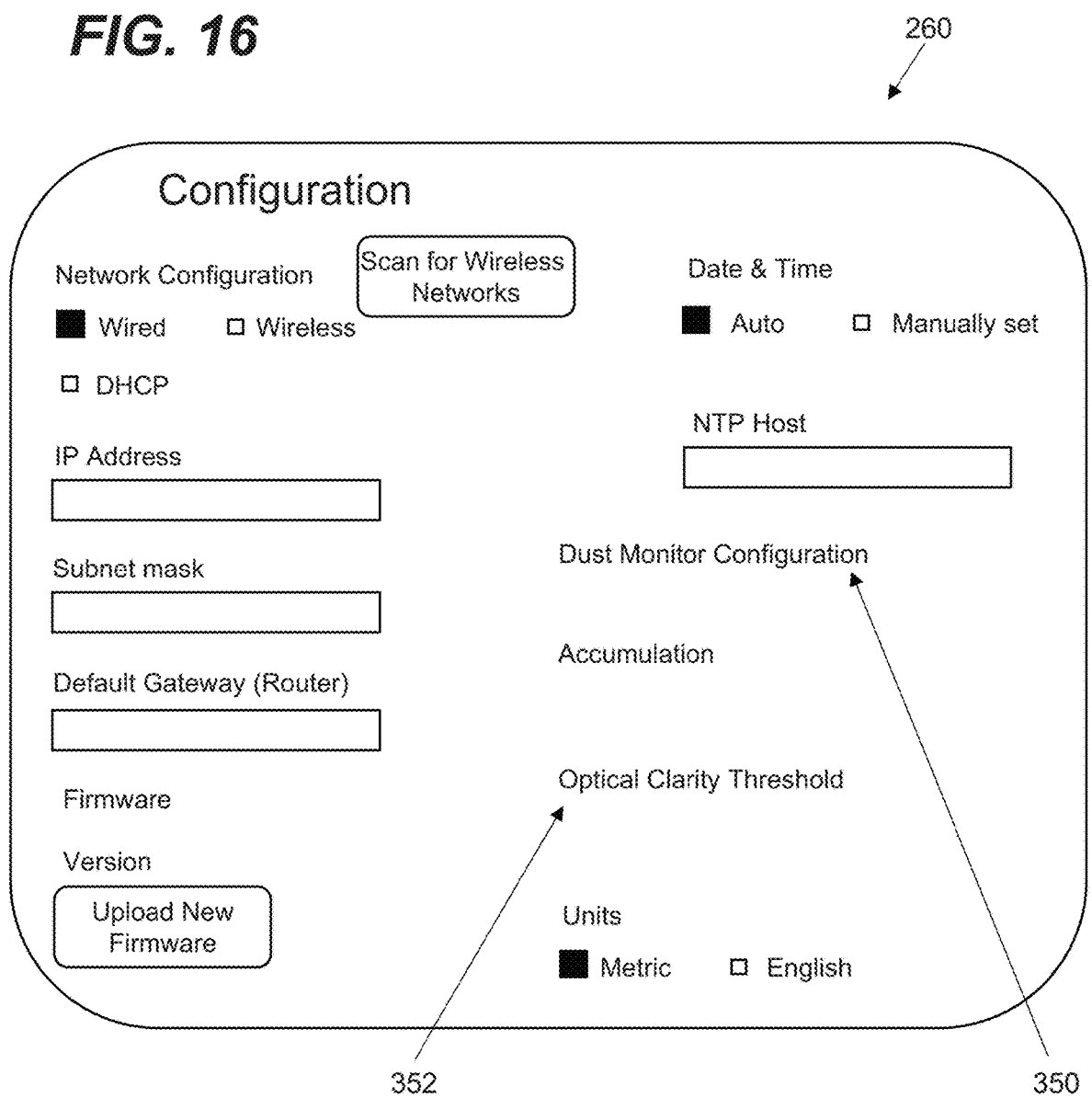

Upon selecting configuration as at 308 in FIG. 11, the device interface as at 260 in FIG. 16 can provide a network configuration page, whereby a user can select DHCP or Static IP Addressing (IP Address, Netmask, Default Gateway) and manage timekeeping, for example.

The interface can provide an option to select an SNTP time server and an option to enter the time manually. The device electronic interface 260 can further provide a dust monitor configuration selection option as at 350, permitting the user to configure for low or high accumulation settings, configure dust alert level in physical units and/or set for SI or English units, for example. The interface (e.g., 260) can also provide for configuring the optical clarity threshold as at 352 whereby the user can set the percentage or other measurement of occlusion for automatically invoking the cleaning assembly to clean the window(s) 115.

Upon selecting the camera/lens option at 310 in FIG. 11, the device interface as at 262 in FIG. 17 can further provide user selections permitting the user to manually take and view a photo as at 358, trigger the cleaning mechanism as at 360, review past photos as at 362 and/or clear one or more photos, for example. It will be appreciated that embodiments of the present disclosure can operate without windows but wherein the cleaning assembly 140 operates to clean the lens of the camera 112 when necessary based on operation of the optics detection subsystem such as described herein.

In operation, embodiments of the device can be calibrated prior to installation in a particular environment or can be calibrated at the location where installed. LED currents and camera exposure time can be established for a base scenario or standard scene, for example. A ruler or fiduciary marks can be provided within view of the camera to assist with assessing the exact distance in a scene that a pixel represents, where the pixel is contained in an image captured or capturable by the camera. In various embodiments, the pixel scale factor is the distance in inches at the dust measurement table that each pixel sees.

A region of interest (ROI) where the dust measurement is to be made can be established and stored. In embodiments where the camera's aim and focus never changes, the ROI can be permanent. In other embodiments, the measurement can still be made but some design changes can occur. For example, the dust table can have more contrast so it is not obscured by the dust.

The fiducial and/or fiduciary marks can be placed permanently in the camera's view.

These marks can be used to perform periodic checks of the device. The design of the marks depend on what is to be checked. The checks can include, for example, checks of spatial calibration, pixel scale factor and ROI to be sure they have not changed. The checks can also include room light level checks to identify when room light is high enough to interfere with the measurement. The checks can include notifications for when it is time to clean the sensor or to check that the dust table surface can be identified. It will be appreciated that fiducial marks can also assist in reviewing the optical clarity, as the camera can capture the location and dimensions of the fiducial marks and the system can compare what is captured to the initial measurements. It will further be appreciated that fiducial marks can assist with implementing a go/no go focus checking algorithm to double check the manual focus setting in the installed setting and at power up.

In embodiments where a single device must measure more than one powder after it is installed, the device can take an image of the dust and adapt the measurement to the dust color. In embodiments where the device uses a color camera, the device can provide information about the dust color. As a result, the device can suggest which dust is being measured. In general, white LEDs can be used for white powders. Alternatively, a specific LED color can be selected for a specific powder type and color. In different embodiments, multicolor LEDs can be used. These LEDs have separately controllable red, green, and blue LED intensities. Further, multiple images can be taken, each image with a different color LED and each immediately after the other. The results can suggest what color LED to use to make the depth measurement. This approach can help with contrast and discrimination in making the measurement.

In environments where the powder is very dark (such as carbon, for example), the powder will not reflect light very well. In this case, the table and the device plastics can be made from white plastic, and the powder can be detected as a dark obscuration on the light background. Dark powder contrast against the table and device background can also be enhanced by using translucent plastics in the table and in the device. Illumination of the translucent plastic components can then be internal to the plastics. In alternative embodiments, the plastic of the dust table and the device can be fluorescent and can thereby show the dark powder location in contrast. While possibly less likely, some powders may fluoresce. This situation can benefit from alternative embodiments which allow some LED and filter combinations that improve contrast and discrimination.

It will be appreciated that room light may interfere with the dust measurement, and it could change throughout the day. The present disclosure contemplates multiple ways to manage the interference of room light. For example, one implementation may expose the camera for a short time, and during that time flash the LEDs brightly. During the short exposure time, the room light will be weak, but the LED light reflected from the dust could be high. In other implementations, the device can employ a neutral density filter over the camera and flash the LEDs brightly. Further, a narrow wavelength band LED can be illuminated and a corresponding narrow band filter can be used in front of the camera. The room light intensity is likely to be small in that wavelength band, but the LED illumination of the dust could be intense.

In various embodiments, the sample area surface can be formed with an over-hang with a sharp edge. In such embodiments, dust will not obscure or will be less likely to obscure the sample area 105. Using image processing, edge-finding techniques on both the top and bottom can assess the extents of the powder image. Also, it can be anticipated that the ROI may change location as the device ages and is employed for long periods of time in a given environment. This may happen, for example, if the camera aim changes or if the camera focus changes. Either of these could happen if the camera is bumped hard enough, if the device becomes warped with excess heat, or if it is screwed down to an uneven surface, for example.

In various embodiments, computer-implemented instructions can execute programming and/or one or more algorithms in operation. For example, background subtraction provides improved contrast and discrimination. Elements positioned or appearing behind the dust table could affect the accuracy of such embodiments. It will be appreciated that different algorithms can be employed to address various scenarios, including scenarios which may only require baseline yet robust algorithms as well as scenarios which may require elaborate and sensitive algorithms.

It will be appreciated that embodiments of the present device and system can employ real time learning (i.e., adaptive learning) to automatically adjust operational parameters based on time-of-day patterns, time rate of dust accumulation and room light patterns, for example.

In various embodiments, the sample surface deposit area can be increased by using a thin piece of aluminum or other material that can be adhered to the top of the table/sample area. This thin material can provide a larger sample area and allow measurements up to a minimum of one-half inch without creating an unwieldy sample pile. Additionally, the thin metal can provide a sharp edge which is useful with a more robust algorithm and calibration as described elsewhere herein.

Figure 18:
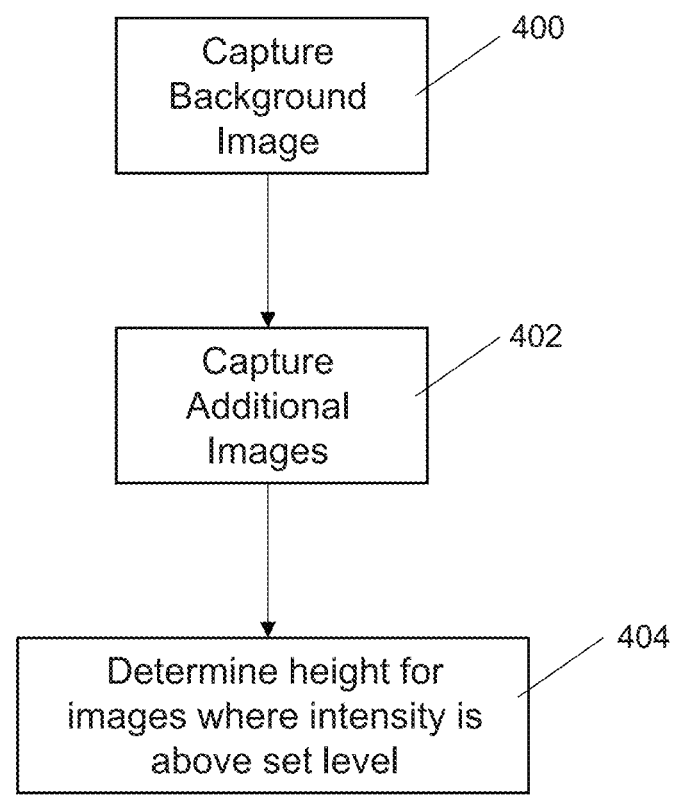
FIGS. 18 and 19 are block diagrams illustrating processing according to different algorithmic approaches according to the present disclosure.
Figure 19:
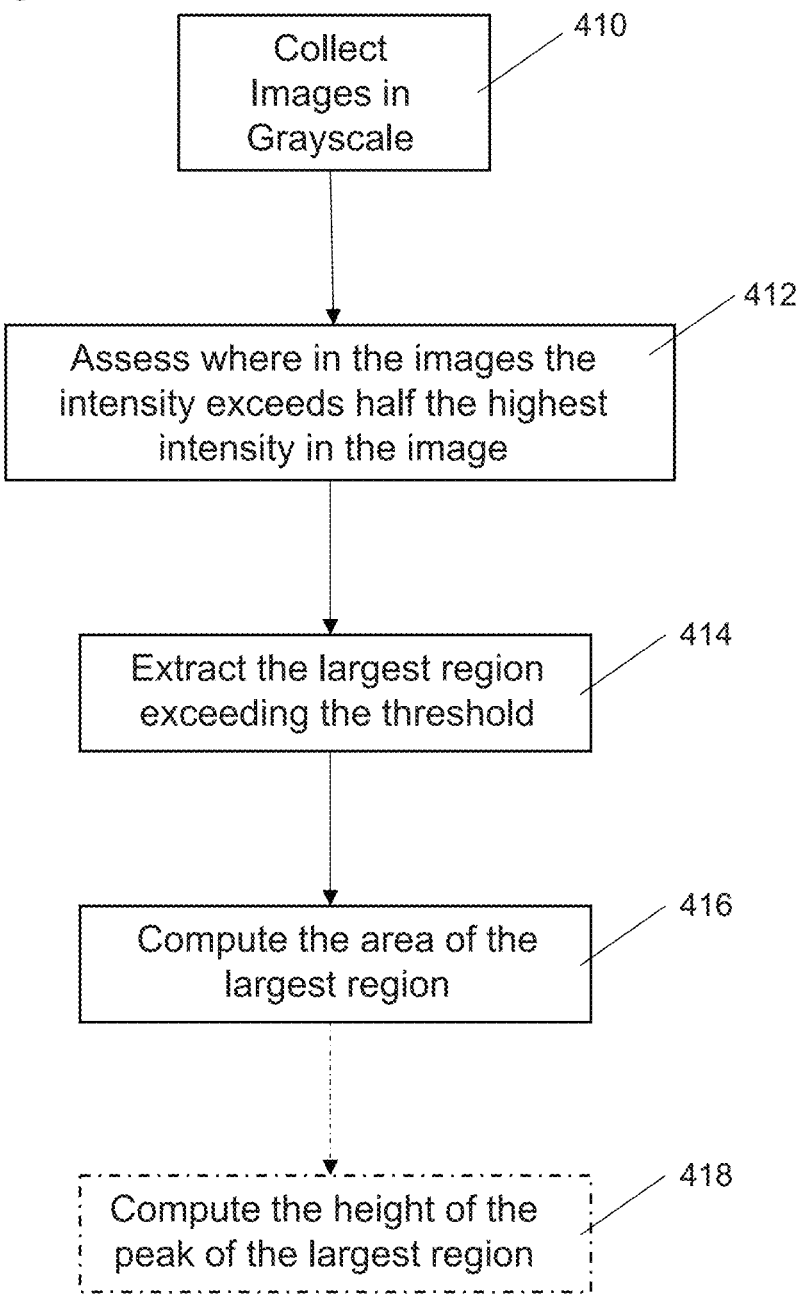

FIGS. 18 and 19 illustrate processing according to different algorithmic approaches. As a first algorithmic approach illustrated in FIG. 18, level crossing can be employed including background subtraction to reach measurement results. Beginning with a clean sample area, a background image is captured by the camera as at 400. This background image is to be subtracted from all future images. The lighting level and camera aim are kept the same. As dust accumulates, additional images are captured as at 402, and the dust/powder height is computed from the pixel number where intensity rises above a set level, such as 125 counts, as at 404. The result is the average depth of the powder if it were spread over the width of the region of interest (ROI).

As a second algorithmic approach illustrated in FIG. 19, binarizing and segmenting can be employed. As at 410, the system captures images in grayscale or otherwise converts images to grayscale. As at 412, the system identifies where in the images the grayscale intensity exceeds half the highest intensity in the image, which is binarizing in the sense that the intensity either does or does not exceed half the highest intensity. Next, the system extracts the largest region which exceeds this threshold as at 414, which is segmenting, and the area of that region is computed. As at 416, the system computes the height of an equal area rectangle having the width of the ROI. This height is the average depth of powder if it were evenly distributed in the ROI. Optionally, as indicated in dashed lines at 418, the system computes the height of the region at its peak.

As a third algorithmic approach, the height from binarizing and segmenting can be used. In this approach, the system computes the maximum height of powder computed in the binarized and segmented region of the previous measure from FIG. 19.

Possible applications of embodiments of the present disclosure include, without limitation, monitoring enclosed combustible dust areas inside manufacturing facilities such as grain mill bid deck areas, hammer mill rooms, truck & rail receiving & loadout areas, tunnels, elevator shafts, electrical chases, and above duct work, I-beams and build support structures and under-ground mine applications. Other applications may also include sifting rooms, mixing rooms, processing rooms, test cells for 3D printing, monitoring above ceiling tiles, and process manufacturing areas in the following industries: feed mills, grain mills, pet food plants, pharmaceutical, forest products industries to include plywood, OSB, particle board, and other forest products engineered wood, plastics, sugar refineries, fertilizer manufacturing, chemical & polymer manufacturing, ammunition manufacturing, metal manufacturing and processing operations, breweries, ethanol manufacturing, starch & gluten manufacturing, commercial bakeries and coal fired utilities. Other uses can include monitoring for non-combustible hazardous dust accumulation levels such as military installation & government building monitoring applications, research facilities, hospitals, construction sites concerned with nuisance or hazardous dust such as silica. The above-described embodiments of the present disclosure may be implemented in accordance with or in conjunction with one or more of a variety of different types of systems, such as, but not limited to, those described below.

It will thus be appreciated that embodiments of the system as described herein includes programming to compute a thickness of accumulated dust on the sample based on captured images. Further, upon the thickness of accumulated dust being determined to meet or exceed a threshold, the programming can issue an alert. Programming associated with the system can also determine whether a window optical clarity level meets or exceeds a threshold for cleaning and, upon the window optical clarity level being determined to meet or exceed the threshold for cleaning, invoke the cleaning assembly to clean the window. In various embodiments, when the programming computes the thickness of accumulated dust, the programming identifies a difference in camera pixels from the captured images between an edge of the sample area and a peak of the accumulated dust. In various embodiments, when the programming computes the thickness of accumulated dust, the programming evaluates measurements from more than one location on the dust measuring platform.

The present disclosure contemplates a variety of different systems each having one or more of a plurality of different features, attributes, or characteristics. A "system" as used herein refers to various configurations of: (a) one or more monitoring systems; and (b) one or more personal computing devices, such as desktop computers, laptop computers, tablet computers, personal digital assistants, mobile phones, and other mobile computing devices. Many of the tasks, such as remotely logging in to the server, programming individual monitoring systems, adjusting device alarm parameters and monitoring dust accumulations may be performed with personal computing devices.

Thus, in various embodiments, the system of the present disclosure includes. (a) one or more computing devices in combination with one or more monitoring systems; (b) one or more personal computing devices, and one or more monitoring systems, alone, or in combination with one another; (c) a single monitoring system; and/or (d) a plurality of monitoring systems in combination with one another.

In certain embodiments in which the system includes a personal computing device in combination with a monitoring system, the monitoring system includes any suitable circuit board that has at least one processor and at least one memory device or data storage device. As further described herein, the personal computing device includes at least one processor configured to transmit and receive data or signals representing events, messages, commands, or any other suitable information between the personal computing device and the monitoring system. The processor of the personal computing device is configured to execute the events, messages, or commands represented by such data or signals in conjunction with the operation of the personal computing device. Moreover, the processor of the monitoring system is configured to transmit and receive data or signals representing events, messages, commands, or any other suitable information between the monitoring system and the personal computing device. The processor of the monitoring system is configured to execute the events, messages, or commands represented by such data or signals in conjunction with the operation of the monitoring system.

In embodiments in which the system includes a personal computing device configured to communicate with a monitoring system through a data network, the data network is a local area network (LAN), a wide area network (WAN), a public network such as the Internet, or a private network. The monitoring system and the personal computing device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

The invention claimed is:

1. A dust accumulation monitoring system, comprising:
an enclosure comprising an external surface and a floor;
a sample area maintained proximate the floor of the enclosure;
a machine vision subsystem maintained within the enclosure, wherein the machine vision subsystem comprises a camera comprising a lens having a field of view comprising the sample area, and wherein the machine vision subsystem is operable to measure dust accumulation on the sample area;
a dirty optics detection subsystem maintained within the enclosure, wherein the dirty optics detection subsystem is in communication with the camera and is operable to detect an optical clarity level of the field of view;
a cleaning assembly in communication with the dirty optics detection subsystem, wherein the cleaning assembly is movably secured to the enclosure and operable to clean an impediment from the field of view;
a dust protection eyebrow secured to the enclosure;
a processor, and
a memory storing instructions, that when executed by the processor, cause the processor to:
compare the optical clarity level from the dirty optics detection subsystem with a threshold for cleaning to determine if the optical clarity level meets or exceeds the threshold for cleaning; and
upon the optical clarity level being determined to meet or exceed the threshold for cleaning, invoke the cleaning assembly to clean the impediment from the field of view.

2. The dust accumulation monitoring system of claim 1, wherein the sample area comprises a platform elevated above the floor.

3. The dust accumulation monitoring system of claim 1, wherein the cleaning assembly comprises a guide ring and a brush, wherein the dust protection eyebrow comprises a groove for receiving the guide ring of the cleaning assembly, and wherein the cleaning assembly is operable to move such that the brush engages the window as the guide ring of the cleaning assembly slides through the groove.

4. The dust accumulation monitoring system of claim 1, wherein the eyebrow is positioned above the window.

5. The dust accumulation monitoring system of claim 1, wherein the cleaning assembly comprises a servo motor, a brush and a drive.

6. The dust accumulation monitoring system of claim 1, wherein the cleaning assembly comprises a frame comprising an opening positionable between the lens and the sample area.

7. The dust accumulation monitoring system of claim 1, wherein the enclosure further comprises a window positioned between the lens and the sample area, and wherein the dirty optics detection subsystem comprises a light source and a photodiode.

8. The dust accumulation monitoring system of claim 7, wherein the photodiode is secured within the enclosure on an opposite side of the sample area from the camera.

9. The dust accumulation monitoring system of claim 7, wherein the photodiode is secured within the enclosure adjacent the camera.

10. The dust accumulation monitoring system of claim 7, wherein the camera comprises the photodiode.

11. The dust accumulation monitoring system of claim 7, wherein the window comprises a first window, and further comprising a second window positioned on an opposite side of the sample area from the first window, wherein the light source is positioned within the enclosure behind the first window.

12. The dust accumulation monitoring system of claim 11, wherein the instructions further cause the processor, upon the optical clarity level being determined to meet or exceed the threshold for cleaning, to invoke the cleaning assembly to clean the first window and the second window.

13. A dust accumulation monitoring system, comprising:
an enclosure comprising a window;
a sample area;
a camera maintained within the enclosure such that the window is between the camera and the sample area, wherein the camera comprises a lens oriented adjacent the sample area and adapted to capture images of the dust measuring platform through the window;
a cleaning assembly;
a processor, and
a memory storing instructions, that when executed by the processor, cause the processor to:
   compute a thickness of accumulated dust on the sample area based on the captured images, wherein computing the thickness of accumulated dust comprises identifying a difference in camera pixels from the captured images between an edge of the dust measuring platform and a peak of the accumulated dust;
   upon the thickness of accumulated dust being determined to meet or exceed a threshold, issuing an alert;
   determine whether a window optical clarity level meets or exceeds a threshold for cleaning; and
   upon the window optical clarity level being determined to meet or exceed the threshold for cleaning, invoke the cleaning assembly to clean the window.

14. The dust accumulation monitoring system of claim 13, wherein computing the thickness of accumulated dust comprises evaluating measurements from a plurality of locations on the sample area.

15. The dust accumulation monitoring system of claim 13, wherein the cleaning assembly comprises a frame and a guide ring, wherein the guide ring is movably securable within the enclosure, wherein the frame comprises a radially outer surface and comprises an opening positionable between the window and the sample area, and wherein the cleaning assembly further comprises a brush secured to the radially outer surface of the vertical frame.

16. A dirty optics detection subsystem for a dust accumulation monitoring system, comprising:
   a light source;
   a dirty optics sensor;
   a processor, and
   a memory storing instructions, that when executed by the processor, cause the processor to:
      receive input from a machine vision subsystem of a dust accumulation monitoring system, wherein the input comprises measurements taken as the dirty optics sensor is exposed to the light source through a window of the dust accumulation monitoring system; and
      upon the input being determined to meet or exceed a threshold, produce an alert signal, wherein the alert signal comprises an alert that the cleaning assembly is not sufficiently operating.

17. The dirty optics detection subsystem of claim 16, wherein the alert signal comprises invoking a cleaning assembly to clean the window.

18. The dirty optics detection subsystem of claim 16, wherein the input comprises measurements taken as the dirty optics sensor is exposed to the light source through a plurality of windows of the dust accumulation monitoring system.

19. The dirty optics detection subsystem of claim 16, wherein the dirty optics sensor comprises a photodiode.

20. The dirty optics detection subsystem of claim 16, wherein the machine vision subsystem comprises a camera.

21. A dust accumulation monitoring system, comprising:
an enclosure comprising a window;
a sample area;
a camera maintained within the enclosure such that the window is between the camera and the sample area, wherein the camera comprises a lens oriented adjacent the sample area and adapted to capture images of the dust measuring platform through the window;
a cleaning assembly, wherein the cleaning assembly comprises a frame and a guide ring, wherein the guide ring is movably securable within the enclosure, wherein the frame comprises a radially outer surface and comprises an opening positionable between the window and the sample area, and wherein the cleaning assembly further comprises a brush secured to the radially outer surface of the vertical frame;
a processor, and
a memory storing instructions, that when executed by the processor, cause the processor to:
   compute a thickness of accumulated dust on the sample area based on the captured images;
   upon the thickness of accumulated dust being determined to meet or exceed a threshold, issuing an alert;
   determine whether a window optical clarity level meets or exceeds a threshold for cleaning; and
   upon the window optical clarity level being determined to meet or exceed the threshold for cleaning, invoke the cleaning assembly to clean the window.

* * * * *